US011123830B2

(12) United States Patent
Ullrich et al.

(10) Patent No.: US 11,123,830 B2
(45) Date of Patent: Sep. 21, 2021

(54) ACCESSORY DEVICE FOR A HAND-HELD POWER TOOL

(71) Applicant: Robert Bosch GmbH, Stuttgart (DE)

(72) Inventors: Andre Ullrich, Leinfelden-Echterdingen (DE); Benjamin Nikolas Fischle, Murr (DE); Juergen Dietel, Stuttgart (DE); Holger Froehling, Stuttgart (DE); Erwin Orendi, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 137 days.

(21) Appl. No.: 16/479,560

(22) PCT Filed: Nov. 20, 2017

(86) PCT No.: PCT/EP2017/079700
§ 371 (c)(1),
(2) Date: Jul. 19, 2019

(87) PCT Pub. No.: WO2018/141430
PCT Pub. Date: Aug. 9, 2018

(65) Prior Publication Data
US 2019/0358758 A1    Nov. 28, 2019

(30) Foreign Application Priority Data

Jan. 31, 2017  (DE) .................... 10 2017 201 558.6

(51) Int. Cl.
*B25D 17/20*   (2006.01)
*B25F 5/02*    (2006.01)
*B23Q 11/00*   (2006.01)

(52) U.S. Cl.
CPC ...... *B23Q 11/0046* (2013.01); *B23Q 11/0071* (2013.01); *B25D 17/20* (2013.01); *B25F 5/02* (2013.01); *B25D 2217/0057* (2013.01)

(58) Field of Classification Search
CPC ....... B25D 17/14; A47L 9/00; B23Q 11/0046; Y10T 408/564; Y10T 408/50
(Continued)

(56) References Cited

U.S. PATENT DOCUMENTS 5,467,835 A  * 11/1995 Obermeier ......... B23Q 11/0046
                                                           175/209
2008/0202781 A1* 8/2008 Nishikawa ........... B25H 1/0078
                                                           173/104
(Continued)

FOREIGN PATENT DOCUMENTS

CN      101096090 A      1/2008
CN      101096096 A      1/2008
(Continued)

OTHER PUBLICATIONS

International Search Report corresponding to PCT Application No. PCT/EP2017/079700, dated Apr. 19, 2018 (German and English language document) (8 pages).

*Primary Examiner* — Nathaniel C Chukwurah
(74) *Attorney, Agent, or Firm* — Maginot, Moore & Beck LLP

(57) ABSTRACT

An accessory device for a hand-held power tool includes a dust collection box that has a housing and a filter unit configured to filter an airflow. The housing is configured to be connected to a housing of the accessory device via a first securing unit. The filter unit is configured to be connected to the housing of the dust collection box via a second securing unit. The filter unit has a first sealing element arranged on the dust collection box side and a second sealing element arranged on the accessory device side. The filter unit is sealed from the housing of the dust collection box and the housing of the accessory device via the first and second (Continued)

sealing elements. The hand-held power tool in one embodiment is configured with a percussive mechanism.

15 Claims, 16 Drawing Sheets

(58) Field of Classification Search
USPC ...... 173/198, 75, 217, 197, 97, 171; 408/55; 55/418
See application file for complete search history.

(56) References Cited

U.S. PATENT DOCUMENTS

| | | | |
|---|---|---|---|
| 2011/0226499 A1* | 9/2011 | Kakiuchi | B23Q 11/0046 173/75 |
| 2012/0298391 A1* | 11/2012 | Kakiuchi | B23Q 11/0046 173/77 |
| 2013/0213683 A1* | 8/2013 | Brewster | B23Q 11/00 173/198 |

FOREIGN PATENT DOCUMENTS

| | | |
|---|---|---|
| CN | 101096097 A | 1/2008 |
| CN | 201659554 U | 12/2010 |
| CN | 102371575 A | 3/2012 |
| CN | 102756361 A | 10/2012 |
| DE | 10 2006 029 625 A1 | 1/2008 |
| DE | 10 2011 087 361 B3 | 1/2013 |
| DE | 10 2017 101 027 A1 | 7/2017 |
| EP | 1 872 900 A2 | 1/2008 |
| EP | 2 185 316 B1 | 12/2010 |
| EP | 2 366 490 A1 | 9/2011 |
| EP | 2 517 824 A1 | 10/2012 |
| EP | 2 599 585 A1 | 6/2013 |

* cited by examiner (A-A)

ACCESSORY DEVICE FOR A HAND-HELD POWER TOOL

This application is a 35 U.S.C. § 371 National Stage Application of PCT/EP2017/079700, filed on Nov. 20, 2017, which claims the benefit of priority to Serial No. DE 10 2017 201 558.6, filed on Jan. 31, 2017 in Germany, the disclosures of which are incorporated herein by reference in their entirety.

BACKGROUND

Described in EP 2 185 316 A1 is a hand-held power tool having a dust extraction means, which comprises a dust box for receiving dust.

SUMMARY

The disclosure relates to an accessory device for a hand-held power tool, in particular for a hand-held power tool having a percussion mechanism, having a dust collection box, wherein the dust collection box has a housing, which is designed to be connectable to the accessory device via a first fastening unit, and has a filter unit, which is designed to filter an airflow, and wherein the filter unit is designed to be connectable to the housing of the dust collection box via a second fastening unit. It is proposed that the filter unit have a first sealing element arranged on the dust collection box side and a second sealing element arranged on the accessory device side, and the filter unit can be sealed off from the housing of the dust collection box and a housing of the accessory device via said sealing elements.

The accessory device is designed, in particular, as a retrofittable suction extraction system for removing dust material at the place of application of the hand-held power tool, during the operation of the hand-held power tool, and for receiving this dust material in the dust collection box. The hand-held power tool is, in particular, a hand-held power tool with which material is removed from a work surface as work is being performed on the latter. For example, the hand-held power tool may be a power drill, a hammer drill, an angle grinder, a circular saw or the like. The accessory device is connected, in particular separably, to the hand-held power tool. A separable connection is to be understood to mean, in particular, a connection that can be separated without the use of tools. In contrast, in connection with this application a fastening is to be understood to mean, in particular, a connection that can be separated by means of a tool. The first and the second fastening unit may each be designed for non-positive and/or positive engagement connection. Owing to the first and the second fastening unit, the dust collection box and the filter unit can be separated particularly easily from the accessory device, thereby facilitating the emptying of the dust collection box and the cleaning of the filter unit.

Conveyance of the dust material from the place of application of the hand-held power tool into the dust collection box is effected by means of an air channel. During operation of the hand-held power tool and/or of the accessory device, an airflow flows from the place of application of the hand-held power tool, via the air channel, into the dust collection box. The airflow may be generated both by the accessory device and by the hand-held power tool. In particular, the accessory device has a fan unit, having an electric motor and a fan element, for generating the airflow. Alternatively, it is also conceivable for the airflow to be generated by a motor cooling system of the hand-held power tool. The dust collection box has at least one opening, through which the dust material can be received in the dust collection box. Furthermore, the dust collection box has an inlet opening, through which the airflow can be directed into the dust collection box, and an outlet opening, through which the filtered airflow exits the dust collection box. In the dust collection box, the dust material is filtered out of the airflow by means of a filter unit. The filter unit is preferably arranged in the region of the outlet opening.

The airflow exits the housing of the accessory device or the housing of the hand-held power tool in the region of the elements generating the airflow, or behind this region in the direction of flow. The first and the second sealing element are advantageously arranged in such a manner that no dust material can go past the filter unit in housing regions that have sensitive electronics or the electric motor. An arrangement of the first sealing element on the dust collection box side is to be understood in this case to mean, in particular, that the first sealing element is fastened to the filter unit and/or to the housing of the dust collection box, and is in bearing contact with the housing of the dust collection box and/or with the filter unit. Analogously, an arrangement of the second sealing element on the accessory device side is to be understood to mean, in particular, that the sealing element is fastened to the filter unit and/or to the housing of the accessory device, and is in bearing contact with the housing of the accessory device and/or with the filter unit. The fastening unit is preferably of an elastic design, in order to seal off gaps, resulting from the production process, at the interfaces between the mutually separable filter unit and dust collection box, and filter unit and accessory device.

Furthermore, the first fastening unit has at least one first actuation element, wherein the connection between the dust collection box and the accessory device can be separated by means of an actuation of the first actuation element. Advantageously, the dust collection box can easily be separated from the accessory device by an actuation of the first actuation element. The first actuation element may be designed, by way of example, as a springing latching element, which is arranged on the outside of the dust collection box. Preferably, the first fastening unit has a plurality of actuation elements, which surround the dust collection box and/or the accessory device in a U shape, whereby unintentional separation of the connection can be prevented.

In addition, the second fastening unit has at least one second actuation element, wherein the connection between the dust collection box and the filter unit can be separated by means of an actuation of the second actuation element. Advantageously, the filter unit can easily be separated from the dust collection box by an actuation of the second actuation element, for the purpose of cleaning the filter unit. Preferably, the second fastening unit has a plurality of actuation elements, which surround the dust collection box and/or the filter unit in a U shape. In particular, in the connected state, the at least one actuation element of the second fastening unit is shielded by the housing of the accessory device, such that, advantageously, no actuation of the second actuation element is possible during operation. The second fastening unit is additionally arranged outside of a region of the dust collection box in which the filtered dust material is received.

Furthermore, the filter unit has a filter element that is fastened to a frame element, whereby, advantageously, the stability of the filter unit is increased. The frame element is produced, in particular, from a plastic that is designed so as to be substantially harder than the filter element. Advantageously, the frame element surrounds the filter element laterally, so that the filter element can be gripped without a deformation on the frame element.

Moreover, the at least one actuation element of the second fastening unit is formed onto the frame element, as a result of which, advantageously, a particularly compact second fastening unit can be realized. In connection with this application, an element that is formed onto another is to be understood to mean, in particular, that the two elements are realized integrally.

In addition, the dust collection box can be received by the housing of the accessory device in a direction radial to a working axis of the hand-held power tool, thereby advantageously rendering possible a rapid and robust connection.

Furthermore, the dust collection box is at least partly surrounded by the housing of the accessory device in the circumferential direction, as a result of which, advantageously, the dust collection box can be protected by the housing of the accessory device.

The housing of the accessory device also has at least one recess, via which the fill level of the dust collection box can be seen. The dust collection box is of a transparent design, such that a fill level of dust material in the dust collection box can advantageously be seen from the outside, in particular without the dust collection box being opened. The recess extends over at least 50% of the length of the dust collection box of gravity, preferably over at least 75% of the length of the dust collection box along gravity. An elongate recess advantageously enables the fill level of the dust collection box to be monitored over a large range. It is likewise conceivable for the recess to be designed in such a manner that the fill level and the filter unit can be seen, at least partly, from the outside.

In addition, when having been fastened to the accessory device, the dust collection box, in particular the filter unit, is at least partly in bearing contact with a housing element that is seated with play. In particular, the housing element is seated in an easily movable manner in the housing of the accessory device, as a result of which, advantageously, when the dust collection box is being connected to the accessory device, tilting between the two parts can be prevented.

The disclosure also relates to a dust collection box for an accessory device as previously described.

Moreover, the disclosure relates to an accessory device for a hand-held power tool, in particular for a hand-held power tool having a percussion mechanism, having a housing, which is designed to be connectable to the hand-held power tool, and having an electric motor. It is proposed that the accessory device have a damping unit, which is designed to be integral with the housing of the accessory device, for the purpose of damping the vibrations caused by the electric motor.

Advantageously, owing to the damping unit, the durability of the seating of the electric motor, and thus the service life of the accessory device, can be prolonged significantly.

The connection of the accessory device to the hand-held power tool is effected at least mechanically, for example via a non-positive and/or positive engagement connection. In particular, the accessory device is also electrically connected to the hand-held power tool, for example via at least one electrical contact element, which is arranged at a coupling region of the accessory device. Advantageously, the accessory device, in particular the electric motor of the accessory device, can be supplied with energy via the at least one electrical contact element. It is likewise conceivable that open-loop and/or closed-loop control signals can be transmitted from the hand-held power tool to the accessory device via the at least one electrical contact element.

As described above, the electric motor of the accessory device may be realized as part of a fan unit, and drive a fan element for the purpose of generating an airflow. However, the described damping unit is not limited to this embodiment of the electric motor, but is also conceivable for electric motors in accessory devices having other intended applications.

Furthermore, the damping unit comprises at least one damping element, which is tangentially in bearing contact with the outer circumferential surface of the electric motor, and in particular applies force radially to the electric motor. The damping element is designed, in particular, to damp the vibrations of the electric motor by means of deformation and/or bending of the damping element and/or by friction on a contact surface of the damping element with the electric motor. In particular, the damping element is designed as a passive damping element that, unlike an active damping element, is realized without sensors or feedback control electronics, and can thus be realized easily and inexpensively. The damping element is realized, at least partly, so as to be integral with the housing of the accessory device, such that the heat produced in the damping of the vibrations can be discharged to the environment in an effective manner via the housing of the hand-held power tool.

The electric motor is of a substantially cylindrical design, at least partly. Tangentially in bearing contact with, in this context, is to be understood to mean, in particular, that the longitudinal extent of the damping element is substantially parallel to a diameter of the electric motor, and the contact surface of the damping element to the electric motor corresponds to at most 25%, preferably in particular 10%, of the length of the damping element. A radial application of force, in this context, is to be understood to mean, in particular, that the damping element is biased radially in relation to the longitudinal extent of the electric motor, in the direction of a longitudinal axis of the electric motor. Advantageously, the damping element can thereby be in bearing contact with the electric motor, without play.

In addition, the damping unit has at least two damping elements, which at least are in bearing contact with opposing sides of the circumferential surface of the electric motor. The two sides are separated from each other, in particular, by a plane along the diameter of the electric motor. Advantageously, one damping element is designed to apply a force radially to the electric motor, along gravity, during operation of the accessory device, and the other damping element is designed to apply a force to the electric motor contrary to gravity, during operation. A second damping element enables the damping to be configured in a particularly effective manner.

The at least one damping element is also realized as a spring bar element. A spring bar element, in this context, is to be understood to mean, in particular, a deformable and/or bendable bar element that has two ends, one end being fastened immovably, and the other end not fastened. In contrast to a deformation, in the case of a bending two opposite sides are always displaced together. In particular, the non-free end of the spring bar element is fastened in a materially bonded manner to the housing of the accessory device, for example by welding or adhesive bonding, or in that the spring bar element is formed onto the housing.

Furthermore, it is proposed that the spring bar element advantageously have a bending stiffness in a range of from 1 N/mm to 150 N/mm. Advantageously, a particularly efficient damping can thereby be achieved. Advantageously, the spring bar element has a bending stiffness in a range of from 3 N/mm to 115 N/mm. Preferably, the damping element has at least two spring bar elements, at least one spring bar element having a bending stiffness of under 10 N/mm, and at least one further spring bar element having a bending stiffness of over 100 N/mm.

In addition, the electric motor is seated, via a receiving flange, on a first front end of the electric motor, in the housing of the accessory device. In particular, the electric motor is fastened to the receiving flange by non-positive and/or positive engagement. The receiving flange is seated, preferably fixed, both axially and rotationally, in the housing of the accessory device. Thus, during operation, the electric motor is advantageously secured by the receiving flange against rotation.

The damping unit is also arranged at an end region of the electric motor that is opposite to the front end. The opposite end region is to be understood to mean, in particular, a region of at most 30%, advantageously 15%, of the length of the outer circumferential surface of the electric motor, with which the at least one damping element has bearing contact.

Furthermore, when the accessory device is in the demounted state, the diameter of the electric motor is designed so as to be greater than the distance between the damping elements in a region of contact with the electric motor. In this context, a demounted state of the accessory device is to be understood to mean, in particular, an accessory device mounted without an electric motor. A radial application of force by the damping elements can thus advantageously be realized in that the opposing damping elements are bent away from each other, contrary to a spring force. The region of contact of the damping elements with the electric motor is, in particular, the region in which the damping elements act upon the electric motor, or are in bearing contact with the electric motor.

The housing of the accessory device also comprises a first housing half-shell and a second housing half-shell, at least one damping element, in particular all damping elements, being arranged in the second housing half-shell. In this context, "arranged in a housing half-shell" is to be understood to mean, in particular, that the damping element is fastened to one housing half-shell and projects partly into the other housing half-shell. Advantageously, owing to such a structure of the housing and such an arrangement of the damping elements, particularly simple mounting of the accessory device can be realized. It is likewise conceivable for at least one damping element to be arranged in the first housing half-shell, and at least one damping element in the second housing half-shell.

The disclosure also relates to an accessory device for a hand-held power tool, in particular for a hand-held power tool having a percussion mechanism, having a housing, which is designed to be connectable to the hand-held power tool, having a fan element, which is designed to generate an airflow for the purpose of conveying dust material, and having an electric motor, which is designed to drive the fan element. It is proposed that the housing of the accessory device have at least one air passage opening, via which the electric motor can be cooled. Advantageously, efficient cooling of the electric motor can be achieved by the air passage opening.

Moreover, the at least one air passage opening is arranged in the region of the electric motor, in particular in the region radially and/or axially outside the electric motor. Advantageously, the efficiency of the cooling can be further increased by such an arrangement of the air passage opening. A region radially outside of the electric motor, in this context, is to be understood to mean, in particular, a region intersected by a straight line that runs radially in relation to a rotation axis of the electric motor and advantageously intersects an air outlet of the electric motor. A region axially outside of the electric motor, in this context, is to be understood to mean, in particular, a region intersected by a straight line that runs parallel to a rotation axis of the electric motor and advantageously intersects an air inlet of the electric motor. The air inlet and/or the air outlet are/is designed, in particular, as openings in the outer housing of the electric motor.

Furthermore, arranged in the region of the at least one air passage opening is at least one air guide element, which is designed, in particular, to shade the electric motor. Shaded, in this context, is to be understood to mean, in particular, that each straight line that starts from the air passage opening and ends at the electric motor intersects the air guide element. Particles that enter the housing of the accessory device via the air passage opening are thus advantageously deflected by the at least one air guide element, as a result of which these particles lose their kinetic energy and the electric motor is protected against damage. In particular, the at least one air guide element is formed onto the housing of the accessory device, in the region of the air passage opening.

In addition, there is at least one filter element arranged at the at least one air passage opening. Owing to the filter element, advantageously, relatively small and relatively large particles can be filtered in an effective manner out of the airflow entering the housing.

Moreover, the at least one air guide element is at least partly surrounded by at least one support element, the support element laterally supporting the electric motor, and in particular forming a filter receiving pocket for the filter element. The support element advantageously supports the seating of the electric motor, and moreover makes it possible to insert the filter element, which simplifies mounting of the accessory device. Preferably, the support element is in bearing contact with the air outlet of the electric motor in such a manner that the air outlet is surrounded, in particular completely, by the support element. In particular, the air inlet of the electric motor is separated from the air outlet of the electric motor in respect of flow by means of the support element. Preferably, the exhaust air of the electric motor is thereby routed, in an exhaust-air channel that is separate from the rest of the housing, in the direction of at least one air passage opening. It can thus be ensured, advantageously, that the electric motor does not take up its own exhaust air again through the air inlet.

Furthermore, the filter element is made from a filter foam, and applied, in particular bonded, on an inner side of the housing of the accessory device. Bonding of the filter element to the inner side of the housing makes it possible to prevent the filter element from being unintentionally detached from its position.

The disclosure furthermore relates to an accessory device for a hand-held power tool, in particular for a hand-held power tool having a percussion mechanism, having a housing, which is designed to be connectable to the hand-held power tool, and having a telescopic unit, which has a telescopic element seated in an axially movable manner in the housing. It is proposed that arranged between the telescopic unit and the housing there is at least one securing element, which is designed to counteract wear.

The telescopic unit is seated in an axially movable manner in the housing of the accessory device, in particular in a housing guide consisting of guide elements. In order to realize a smooth and axially movable seating of the telescopic unit, a small amount of play is advantageously provided between the telescopic unit and the housing guide. Both the telescopic unit and the housing guide have contact surfaces, at which the telescopic unit and the housing guide are in mutual bearing contact. Owing to the movement of the telescopic unit, the contact surfaces are moved relative to each other, and friction is produced. This friction causes wear, i.e. removal of material at the contact surfaces. The contact surfaces are thus wear surfaces. Advantageously, the securing element counteracts increasing wear, in that the securing element is designed to slow down the wear and/or to enable the telescopic unit to be seated partly without play.

Furthermore, the at least one securing element is arranged on an inner side of the housing and/or on the telescopic unit. Advantageously, the wear is thereby counteracted in a particularly effective manner. In particular, the securing element is arranged in the region of a wear surface. Particularly preferably, the securing element is designed, at least partly, as a wear surface. In particular, the securing elements may be arranged in one of the housing half-shells, advantageously in both housing half-shells.

Furthermore, the securing element biases the telescopic unit in at least one first direction. In particular, the securing element is designed in such a manner that, as wear increases, the amount of bias by the securing element is first reduced, without the play between the telescopic unit and the housing, in the region of the securing element, being increased. In particular, during operation of the accessory device, the securing element acts substantially along gravity.

Moreover, at least one further securing element biases the telescopic unit in a direction opposite to the first direction. Advantageously, the wear is thereby counteracted in a yet more efficient manner.

Furthermore, at least one additional securing element biases the telescopic unit in at least one further direction, which in particular extends perpendicularly in relation to the first direction. Advantageously, the wear is thereby efficiently counteracted in a further direction.

In addition, the securing element is arranged in an inlet region within the housing for the telescopic unit. Advantageously, the wear can thereby be counteracted at the location at which it is greatest. The inlet region extends axially along the movement direction of the telescopic unit, in particular over the region of the wear surfaces, which are in contact with each other, both when the telescopic unit is in a retracted state and when in an extended state.

Moreover, the securing element is designed, at least partly, as a mechanical energy storage element, in particular as a spring plate, as a ball pressure piece or as a contact retention clip. Preferably, the securing element applies a force the housing guide or the telescopic unit directly, and irrespective of the position of the telescopic unit. The securing element may be designed so as to be partly integral with the housing of the accessory device. In particular, the mechanical energy storage element may be seated in the housing of the accessory device.

Furthermore, the securing element forms a contact with the telescopic unit and/or the housing only after attaining a wear threshold. Advantageously, following attainment of the wear threshold, the wear can thereby be slowed down. A wear threshold is to be understood to mean, in particular, that the securing element forms a wear surface, and comes into contact with both the telescopic unit and the housing only after an anticipated amount of wear is sustained.

The disclosure additionally relates to an accessory device for a hand-held power tool, in particular for a hand-held power tool having a percussion mechanism, having a housing, which is designed to be connectable to the hand-held power tool, and having a telescopic unit, which has a telescopic element seated in an axially movable manner in the housing. It is proposed that a suction head be arranged at a front end of the telescopic unit, wherein the suction head is fastened to the telescopic unit via an adapter element, and a dust receiving element being separably connected to the adapter element.

During operation of the accessory device, the suction head acts, in particular by means of stop faces, upon the work face at the place of application of the hand-held power tool, in particular around the place of application of the hand-held power tool. The suction head advantageously comprises a first region of the air channel of the accessory device, through which the dust material can be conveyed from the place of application of the hand-held power tool into the dust collection box of the accessory device, during operation. Advantageously, during operation, an insert tool of the hand-held power tool is surrounded, at least partly, in particular completely, by the suction head, in order to guide, insofar as possible, all dust material into the air channel.

As a result of working together with the accessory device, the dust receiving element of the suction head can become worn over time. Advantageously, owing to the fact that the dust receiving element can be connected in a separable manner on the suction head, the dust receiving element can easily be replaced. Furthermore, the dust receiving element may be designed for differing insert tools such as, for example, chisels, drill bits or hollow core drill bits. Changing over to a dust receiving element adapted to the insert tool to be used advantageously enables the accessory device to be adapted to a variety of insert tools. Arranged between the dust receiving element and the adapter element, advantageously, is a seal, which is designed to prevent the exit of dust particles at the connection face between the dust receiving element and the adapter element.

The disclosure additionally relates to a system composed of an accessory device, as described in the preceding section, and a further dust receiving element. It is proposed that the further dust receiving element be designed to be connectable to the adapter element of the suction head, and the further dust receiving element be of a length that differs from a length of the dust receiving element.

Advantageously, a particularly short structural design of the accessory device can thereby be achieved, which additionally can be adapted to structural designs of the hand-held power tool of differing lengths. In particular, the dust receiving element is designed so as to be longer than the further dust receiving element. Owing to the suction head being realized substantially in two parts, by an adapter element and a dust receiving element, the region of the air channel arranged in the suction head can advantageously be optimized in respect of flow.

Furthermore, the disclosure relates to an accessory device for a hand-held power tool, in particular for a hand-held power tool having a percussion mechanism, having a housing, which is designed to be connectable to the hand-held power tool, wherein the accessory device has at least one air channel, via which workpiece particles can be conveyed away from a work location. It is proposed that the accessory device have a sensor unit, which is designed to detect a variation of the pressure and/or volume flow. Advantageously, important operating parameters of the accessory device such as, for example, the fill level of the dust collection box, or a blockage of the air channel, can be detected by the measurement of the pressure or of the volume flow.

In addition, the accessory device has a fan unit, which is designed to generate an airflow for conveying dust material, the fan unit comprising an electric motor that is designed to drive a fan element.

Moreover, the accessory device has a dust collection box.

Furthermore, the sensor unit is designed to detect an operating parameter of the electric motor, in particular a rotational speed of the electric motor or a drive current of the electric motor. Advantageously, a characteristic quantity of the pressure and/or of the volume flow can easily be sensed by means of the operating parameter of the electric motor. For example, if the air channel is blocked, less air, or dust material, is conveyed by the fan element. Owing to the lesser pressure, on the one hand the rotational speed of the fan element, or the rotational speed of the electric motor, is increased, and on the other hand the power consumption of the electric motor, or the drive current present at the electric motor, drops. The operating parameter of the electric motor may be sensed, in particular, by a set of electronics, which is designed to control the electric motor of the accessory device by closed-loop or open-loop control. By way of example, the set of electronics may be realized as a set of electronics of the accessory device or as a set of electronics of the hand-held power tool.

In addition, the sensor unit comprises at least one motor sensor element, wherein the at least one motor sensor element is designed as an inductive sensor, as a Hall sensor, as an oscillatory sensor, as an optical sensor or as a magnetoresistive sensor. The motor sensor element is designed, in particular, to sense a characteristic quantity of the rotational speed of the electric motor. Advantageously, the motor sensor element is electrically connectable to the set of electronics of the accessory device.

Furthermore, the sensor unit is arranged in the region of the airflow, in particular after a filter element in the direction of flow, preferably in the region of a fan element. Advantageously, particularly precise sensing of the pressure and/or of the volume flow can be realized by means of such an arrangement of the sensor unit. In particular, by arranging the sensor unit behind the filter element, it can be ensured that the sensor element cannot be damaged by dust material. It is likewise conceivable, in the case of a sufficiently protected design of the sensor unit, for the sensor unit to be arranged in the dust collection box or in the air channel. Preferably, the dust collection box is arranged in a receiving pocket for the fan element, in which the fan element is rotatably seated.

Moreover, the sensor unit comprises at least one mechanical and/or at least one electronic air sensor element. Advantageously, a characteristic quantity of the pressure and/or of the volume flow can be sensed by means of the air sensor element. An electronic air sensor element is to be understood to mean, in particular, an air sensor element that converts the sensed characteristic quantity of the pressure and/or of the volume flow into an electrical signal that, in turn, can be routed to a set of electronics. The electronic air sensor element may be realized as a flow sensor, such as, for example, an ultrasonic flow sensor or a magnetic-inductive flow sensor. It is likewise conceivable for the electronic air sensor element to be realized as a pressure sensor. A mechanical air sensor element is to be understood to mean, in particular, an air sensor element that does not have any electrical connections.

In addition, the accessory device comprises an indicating unit, which is designed to indicate a variation of the pressure and/or of the volume flow. Advantageously, the fill level can be indicated continuously, or in discrete steps, or intervals, via the indicating unit. It is likewise conceivable that a blockage of the air channel can be indicated via the indicating unit.

Furthermore, the indicating unit has an optical indicating element, a haptic indicating element and/or an acoustic indicating element. Advantageously, a status of the accessory device can be signaled to the user of the accessory device by the indicating element. The optical indicating element may be realized, by way of example, as a single-color or multicolor illumination element, for example as an LED. It is likewise conceivable for the optical indicating element to be represented as a screen element, which in graphical form represents information concerning the fill level and/or the blockage of the air channel. The haptic indicating element may be realized, by way of example, as a vibration-generating element, for example as a small motor, which is arranged, in particular, in a grip region of the accessory device. The acoustic indicating element is advantageously realized as a loudspeaker element. The indicating element may be electrically connected to the air sensor element and/or to the set of electronics of the accessory device. Preferably, the indicating element is designed to be controllable via the set of electronics of the accessory device.

Moreover, the mechanical air sensor element and the optical indicating element are coupled to each other. In particular, a mechanical coupling is to be understood in this case, such that a movement of the optical indicating element is constrained by a movement of the mechanical air sensor element.

Moreover, the disclosure relates to a hand-held power tool having an accessory device as previously described.

In addition, the sensor unit and/or the indicating unit are arranged in or on the hand-held power tool. Advantageously, a particularly efficient sensor unit, or indicating unit, can thereby be realized. In particular, an optical indicating element of the indicating unit is arranged laterally or on the upper side of the hand-held power tool in such a manner that a user can see the indicating element as work is being performed. Furthermore, it is conceivable for a haptic indicating element to be realized, advantageously, on a grip region of the hand-held power tool.

Furthermore, the indicating unit is advantageously realized externally. An external indicating unit is to be understood to mean, in particular, an indicating unit that is realized as a separate device, and that can wirelessly receive, or exchange, information/control signals from the sensor unit. The external indicating unit may be, for example, a smartphone.

Furthermore, it is proposed that the sensor unit have a communication interface, which is designed to transmit information wirelessly. Preferably, the communication interface is designed to transmit information wirelessly to a smartphone.

Moreover, a drive unit of the hand-held power tool can be controlled, in particular can be switched off, in dependence on a signal, in particular a fault signal, of the sensor unit. In particular, the electric motor can be controlled in dependence on a signal of the sensor unit. In the case of working with materials that are hazardous to health, the electric motor can advantageously be switched off if a threshold value of the fill level of the dust collection box is exceeded, or if a blockage of the air channel has been ascertained.

BRIEF DESCRIPTION OF THE DRAWINGS

Further advantages emerge from the following description of the drawings. The drawings, the description and the claims contain numerous features in combination. Persons skilled in the art will also expediently consider the features singly, and combine them to form appropriate further combinations.

There are shown.

DETAILED DESCRIPTION

Figure 1:
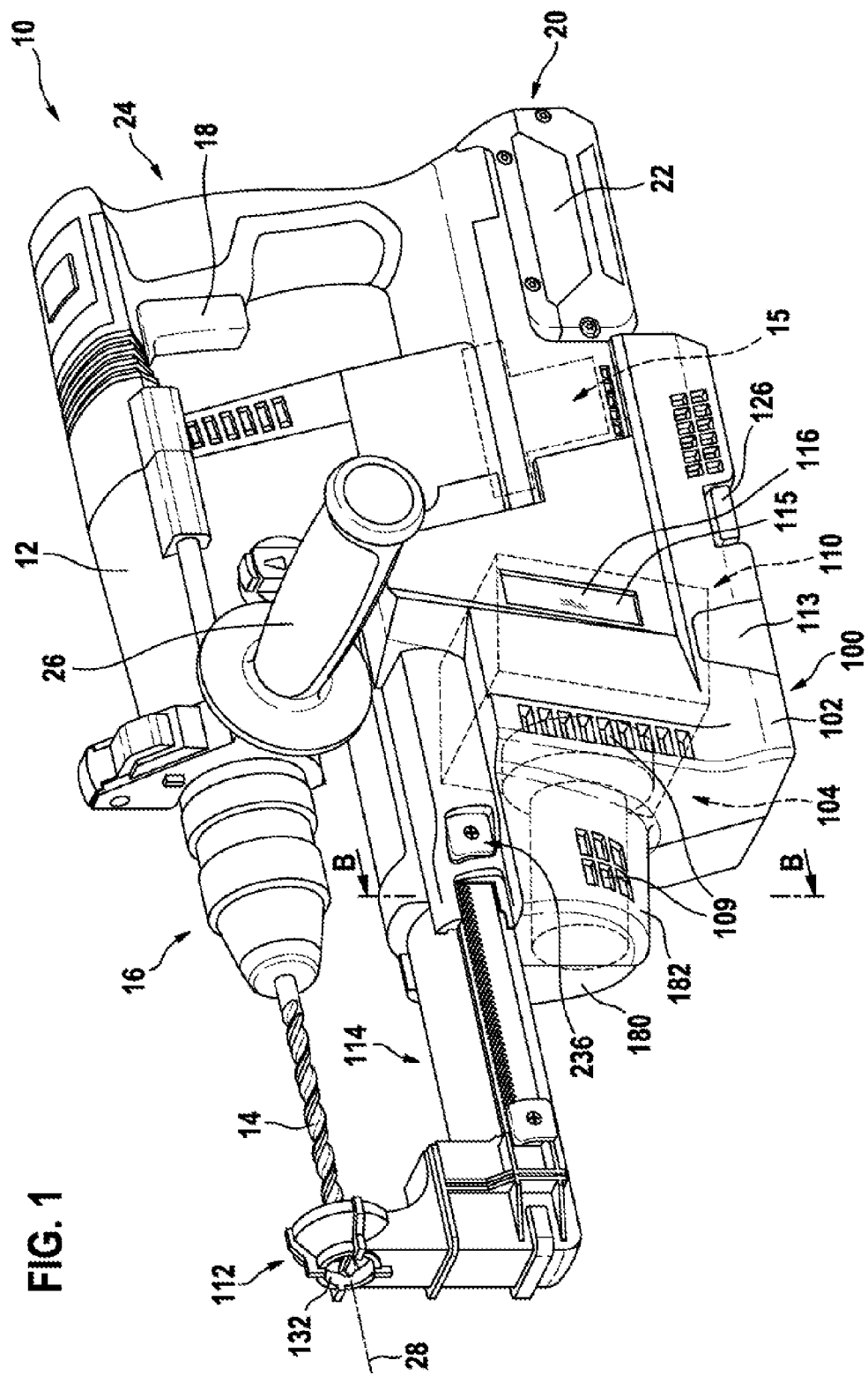
FIG. 1 a perspective view of a first embodiment of an accessory device, fastened to a hand-held power tool.

Shown in FIG. 1 is a perspective view of a first embodiment of an accessory device 100 that is separably connected to a hand-held power tool 10. The hand-held power tool 10 has a housing 12, which in particular is realized as an outer housing. The hand-held power tool 10 is realized, by way of example, as a hammer drill. The hand-held power tool 10 has a drive unit (not represented), which is designed to drive an insert tool 14 in rotation and/or percussively, via a transmission unit (not represented). For this purpose, the drive unit of the hand-held power tool 10 has an electric motor 15, the rotation axis of which is arranged substantially perpendicularly in relation to the work axis 28 of the hand-held power tool 10. The drive unit has, in particular, a percussion mechanism. The insert too 14 is received by the hand-held power tool 10 via a tool receiver 16. The tool receiver 16 is realized, by way of example, as an exchangeable drill chuck. It is also conceivable, however, that the tool receiver 16 may be realized as a non-exchangeable, fixed, drill chuck. The hand-held power tool 10 has an operating switch 18, the hand-held power tool 10 being able to be switched on or off by means of an actuation of the operating switch 18. The hand-held power tool 10 has an energy supply unit 20, which is designed to supply the hand-held power tool 10 with energy. The energy supply unit 20 comprises a hand-held power tool battery pack 22, which is separably connected to the housing 12 of the hand-held power tool 10. The housing 12 has a grip region 24, on which the operating switch 18 is arranged. In order to ensure secure gripping of the hand-held power tool 10, the hand-held power tool 10 has an ancillary handle 16, which is separably connected on the housing 12.

The accessory device 100 has a housing 102, which is separably connected to the hand-held power tool 10. There is a fan unit 104 arranged in the housing 102 of the accessory device 100. The fan unit 104 comprises a drive unit, which is realized as an electric motor 106, and a fan element 108, which is rotatably seated in the housing 102 (see FIG. 3). Arranged in the region of the fan unit 104, in particular in the region of the electric motor 106 and in the region of the fan element 108, are air passage openings 109, through which air can enter and/or exit the housing 102. The fan unit 104 is designed to generate, during operation of the accessory device 100, an airflow that conveys dust material from the place of application of the insert tool 14, via an air channel 105, into a dust collection box 110 (see FIG. 3). During operation of the accessory device 100, the airflow (indicated by means of arrows) enters the accessory device 100 via a suction head 112. The distance of the suction head 112 from the hand-held power tool 10, in particular from the tool receiver 16 of the hand-held power tool 10, is designed to be settable in a variable manner via a telescopic unit 114, which is assigned to the accessory device 100. The dust collection box 110 is separably connected to the accessory device 100 by means of a first fastening unit 113. The connection of the dust collection box 110 to the accessory device 100 is effected, in particular, by inserting the dust collection box 110 into the accessory device 100, the insertion being effected substantially perpendicularly in relation to the work axis 28 of the hand-held power tool 10. The dust collection box 110 comprises a transparent housing 115. An elongate recess 116 in the housing 102 of the accessory device 100 is advantageously arranged in such a manner that the fill level of dust material in the dust collection box 110 is visible through this recess 116.

Figure 2:
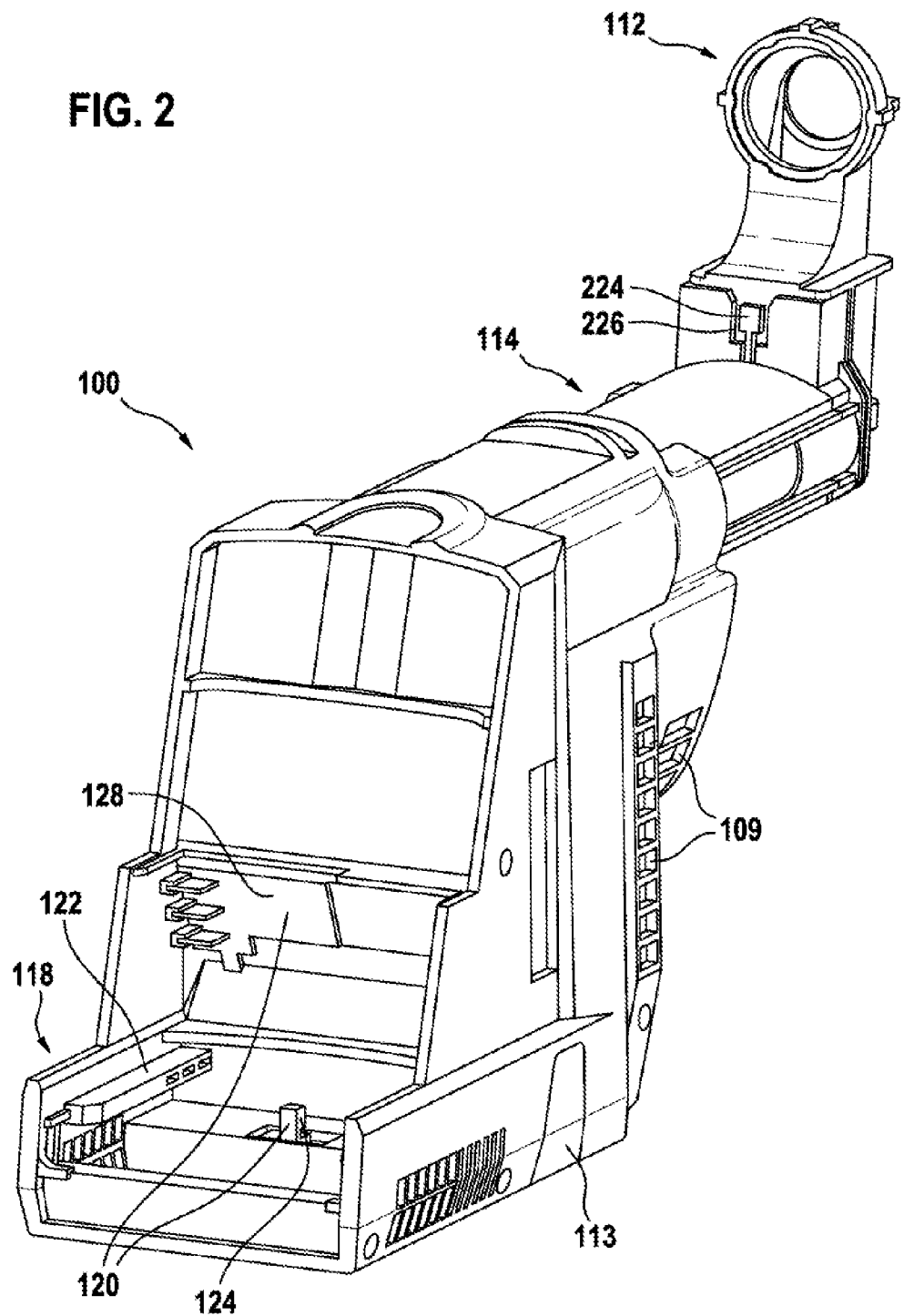
FIG. 2 a perspective view of the back side of the accessory device according to FIG. 1.

Shown in FIG. 2 is a perspective view of the back side of the accessory device 100 according to FIG. 1. Arranged on the back side of the accessory device 100 is the coupling region 118, which comprises both mechanical and electrical interface elements 120. For the purpose of mechanically connecting the accessory device 100 to the hand-held power tool 10, the accessory device 100 is slid along guide rails 122, which are arranged parallel to the work axis 28. When the accessory device 100 is in the end position on the hand-held power tool 10, a spring-loaded positive-engagement element 124 of the accessory device 100 latches into a corresponding undercut element (not represented) on the housing 12 of the hand-held power tool 10. Owing to the guide rails 122 and the positive-engagement element 124, the accessory device 100 is designed to be captively connectable to the hand-held power tool 10. The connection can be separated by means of an actuation of a connection element 126 (see FIG. 1), an actuation of the connection element 126 causing the positive-engagement element 124 to be displaced contrary to the spring force. The coupling region 118 furthermore comprises an electrical interface 128, comprising three electrical contacts, that is designed to electrically connect the accessory device 100 to the hand-held power tool 10 via a connection to an electrical interface, not represented. Via the electrical interface 128, the fan unit 104 can be supplied with energy by the energy supply unit 20 of the hand-held power tool 10. In addition, via the electrical interface 128 the fan unit 104 can be electrically connected to a set of control electronics 15 of the hand-held power tool 10, in particular the operating switch 18 of the hand-held power tool 10, such that an actuation of the operating switch 18 activates the fan unit 104, or the accessory device 100.

Figure 3:
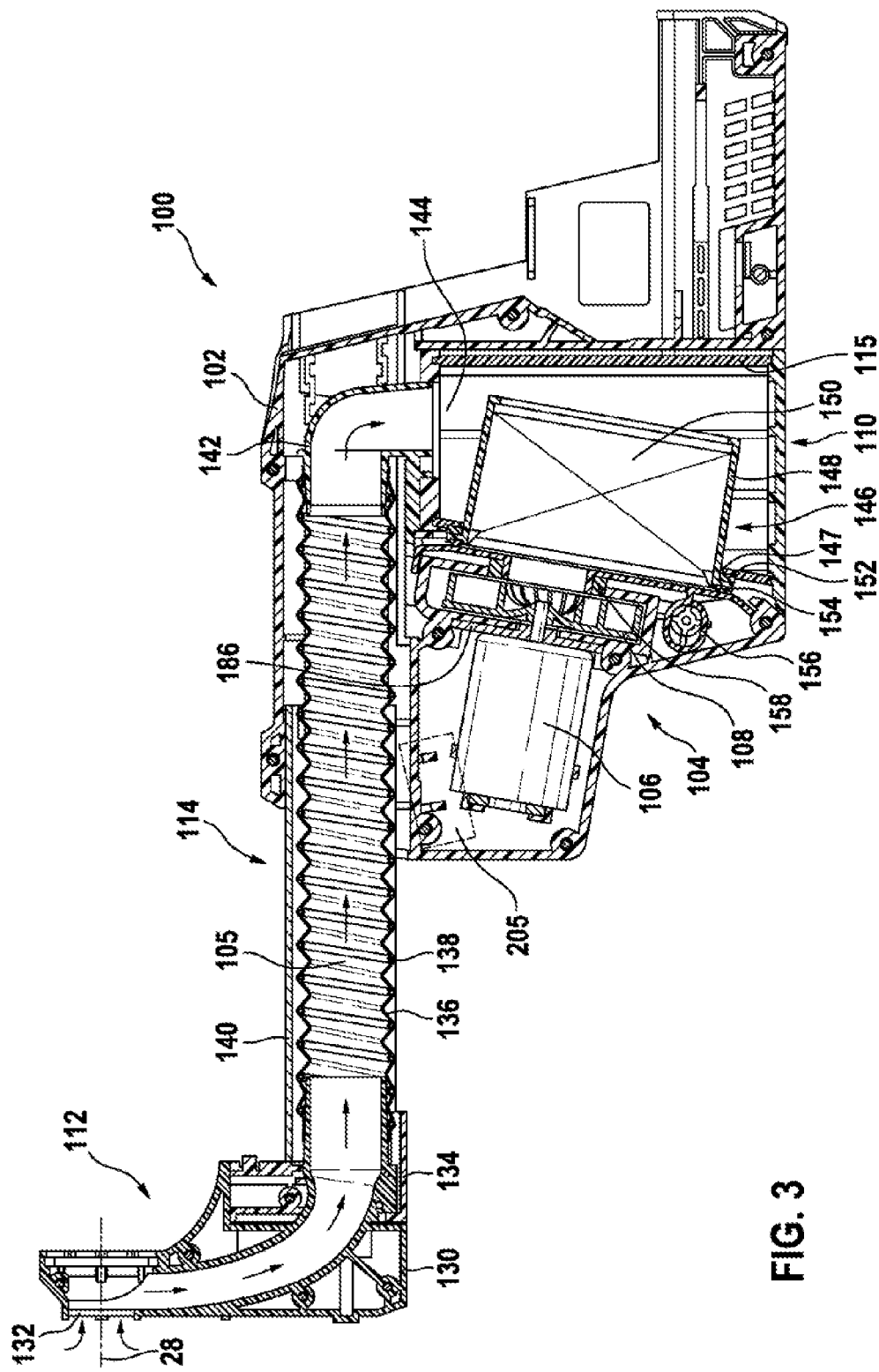
FIG. 3 a longitudinal section of the accessory device according to FIG. 1.

Shown in FIG. 3 is a longitudinal section of the accessory device 100 according to FIG. 1. The suction head 112 comprises a dust receiving element 130, which has an opening 132 arranged concentrically a round the work axis 28 of the hand-held power tool 10. The dust receiving element 130 is separably connected to an adapter element 124, which is likewise assigned to the suction head 112 and fastened to the telescopic unit 114. The suction head 112 is realized as a first portion of the air channel 105. The second portion of the air channel 105 is formed by an elastic tube element 136, integrated in which there is a metallic spring spiral 138. The tube element 136 is seated radially in a telescopic element 140 of the telescopic unit 114, the telescopic element 140 being seated in an axially movable manner in the housing 102 of the accessory device 100. At a first end, the tube element 136 surrounds the adapter element 134. At a second end, the tube element 136 encompasses a pipe elbow element 142, which forms a third and final portion of the air channel 105. Arranged behind the pipe elbow element 142, in the direction of flow, is an inlet opening 144 of the dust collection box 110. The dust collection box 110 has a filter unit 146, which is designed to filter dust particles out of the airflow. The filter unit 146 comprises a frame element 148, to which a filter element 150 is fastened. By way of example, the filter element 150 is realized as a folded filter. The filter unit 146 is separably connected to the dust collection box 110. In particular, the filter unit 146 is arranged at an outlet opening 147 of the dust collection box 110, via which the airflow exits the dust collection box 110. In order to prevent dust material from exiting the dust collection box 110 past the filter element 150, the dust collection box 110 has a first sealing element 152 and a second sealing element 154. The first sealing element 152 is arranged on the filter unit 146 on the dust collection box side. The second sealing element 154 is arranged on the filter unit 146 on the accessory device side. In particular, the first sealing element 152, on at least one side, acts upon the dust collection box 110, and the second sealing element 154, on at least one side, acts upon the housing 102 of the accessory device 100. In order additionally to seal off the dust collection box 110 on the side of the outlet opening 147, the dust collection box 110, in particular the second sealing means 154 of the dust collection box 110, acts upon the housing 102 of the accessory device 100 via a housing element 156 that is seated with play. The housing element 156 is assigned to the housing 102 of the accessory device 100, and movably seated in the housing 102. Additionally arranged between the housing element 156 and the housing 102 is an elastic tolerance compensation element 158, which, by way of example, is realized as a rubber ring and which can be deformed when the dust collection box 110 is being connected to the accessory device 100.

Figure 4:
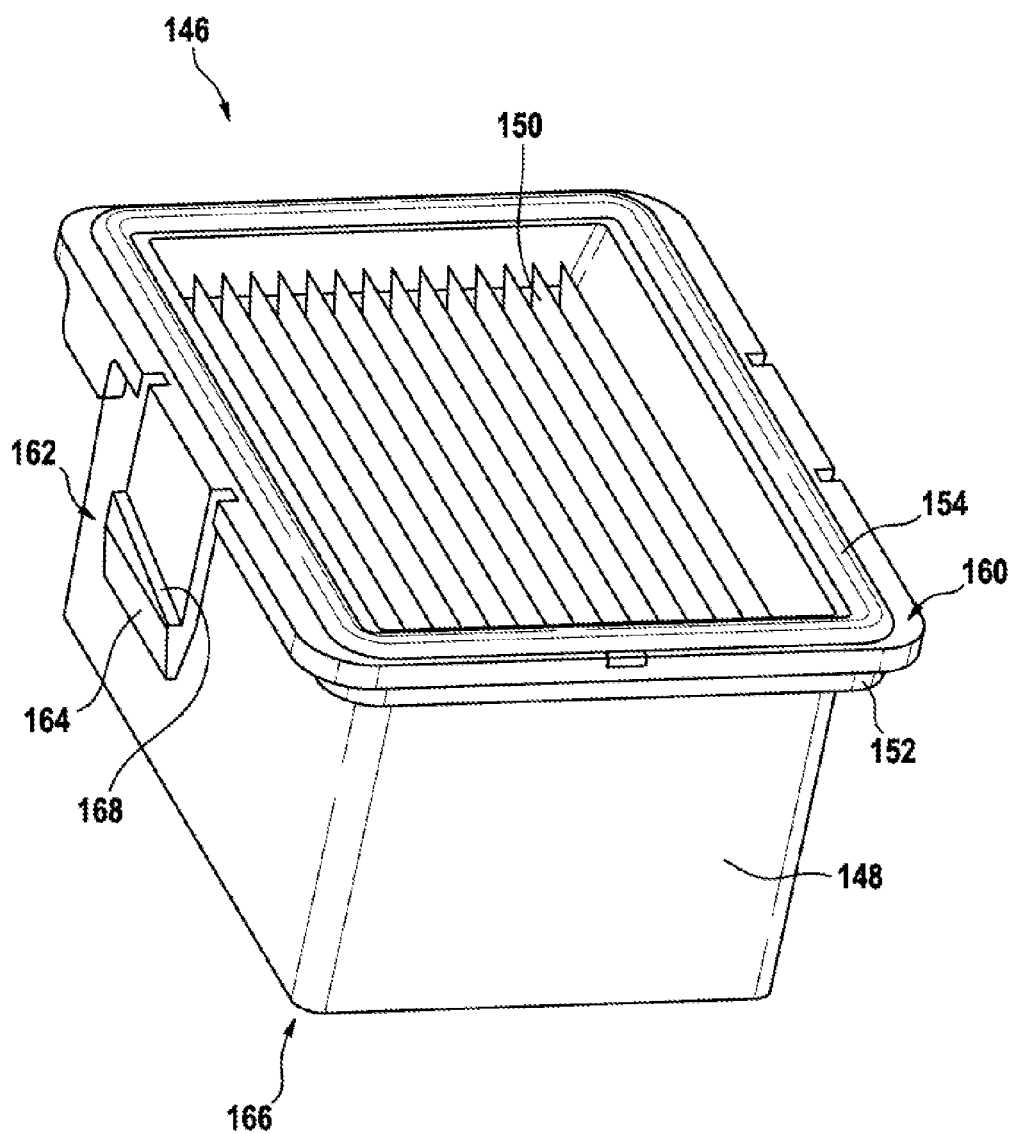
FIG. 4 a perspective view of a sensor unit.

Shown in FIG. 4 is a perspective view of the filter unit 146 of the dust collection box 110. The frame element 148 completely surrounds the filter element 150 laterally. The frame element 148 is bent perpendicularly outward at its upper edge 160. The first sealing element 152 and the second sealing element 154 are arranged on opposite faces, in particular all the way round, at this outwardly bent upper edge 160. The filter unit 146 is separably connected to the dust collection box 110 by means of a second fastening unit 162. The second fastening unit 162 has two opposing actuation elements 164, which advantageously are centrally formed onto the upper edge 160 of the frame element 148. The actuation elements 164 of the second fastening unit 162 extend in the direction of a lower edge 166 of the frame element 148, and each have an undercut element 168.

Figure 5:
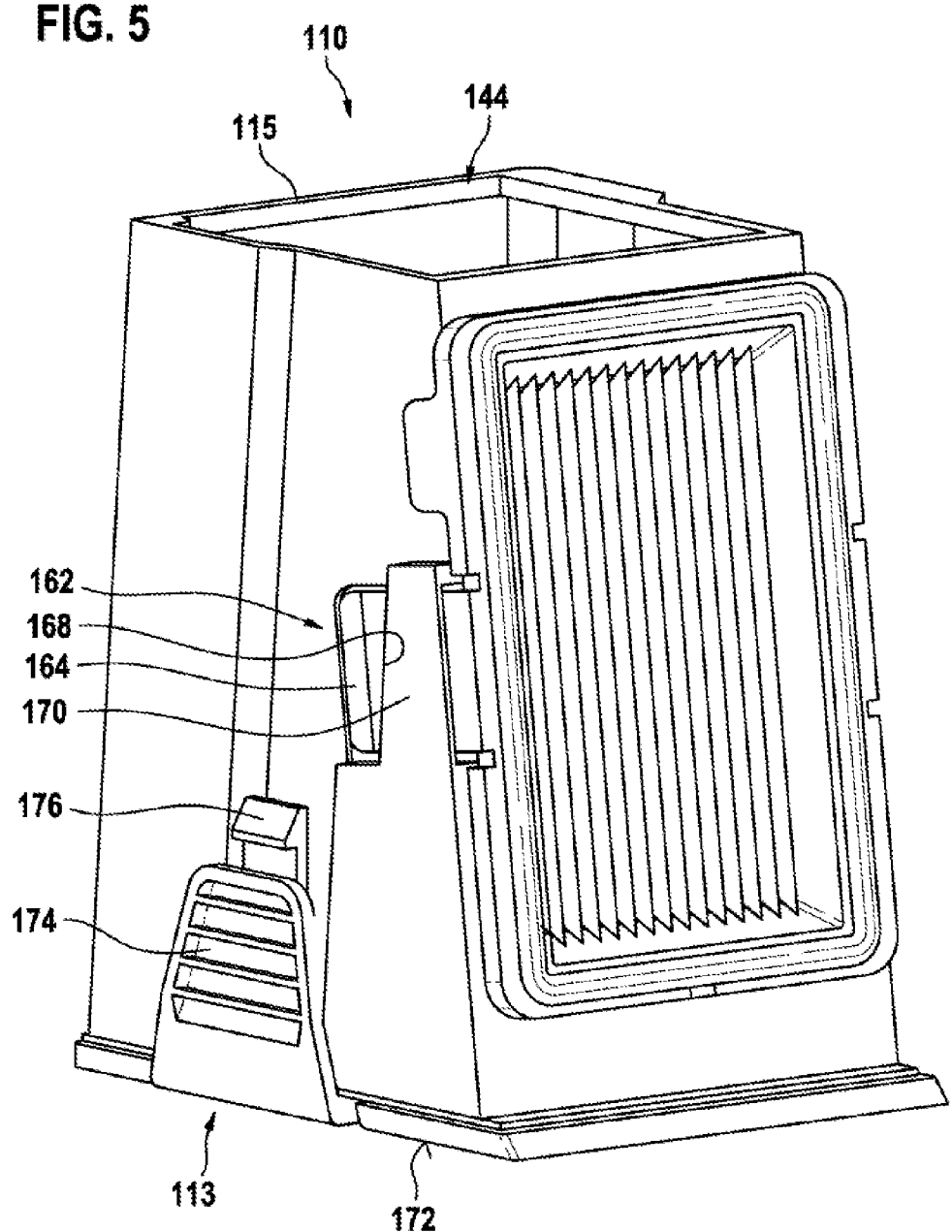
FIG. 5 a perspective view of a dust collection box having an inserted filter unit.

Shown in FIG. 5 is a perspective view of the dust collection box 110 having an inserted filter unit 146. The housing 115 of the dust collection box 110 has two opposing pockets 170, which are assigned to the second fastening unit 162. For the purpose of connecting the filter unit 146 to the housing 115 of the dust collection box 110, the actuation elements 164 are introduced into the pockets 170, upon which the actuation elements 164 first bend inward, until the undercut elements 168 come into engagement with the rear end of the pocket 170 and the actuation elements 164 are released. The filter unit 146 is thus connected by non-positive and positive engagement to the housing 115 of the dust collection box 110. The undercut can be separated again by a pressure upon the actuation elements 164.

The dust collection box 110 has a base 172, which is screw-connected to the housing 115 of the dust collection box. Formed onto the base 172 are two opposing spring actuation elements 174, which are assigned to the first fastening unit 113. The actuation elements 174 extend substantially parallel to the housing 115 and end in a latching lug 176. For the purpose of connecting the dust collection box 110 to the accessory device 100 by non-positive and positive engagement, the latching lugs 176 of the first fastening unit 113 latch in corresponding pockets 178 (see FIG. 6) on the inner side of the housing 102 of the accessory device 100. According to FIG. 1, the housing 102 of the accessory device 100 is composed of a first housing half-shell 180 and a second housing half-shell 182. During assembly, the two housing half-shells 180, 182 are connected to each other, by means of screw connections, along a connection plane that runs through the peripheral edges 184 of the housing half-shells 180, 182.

Figure 6:
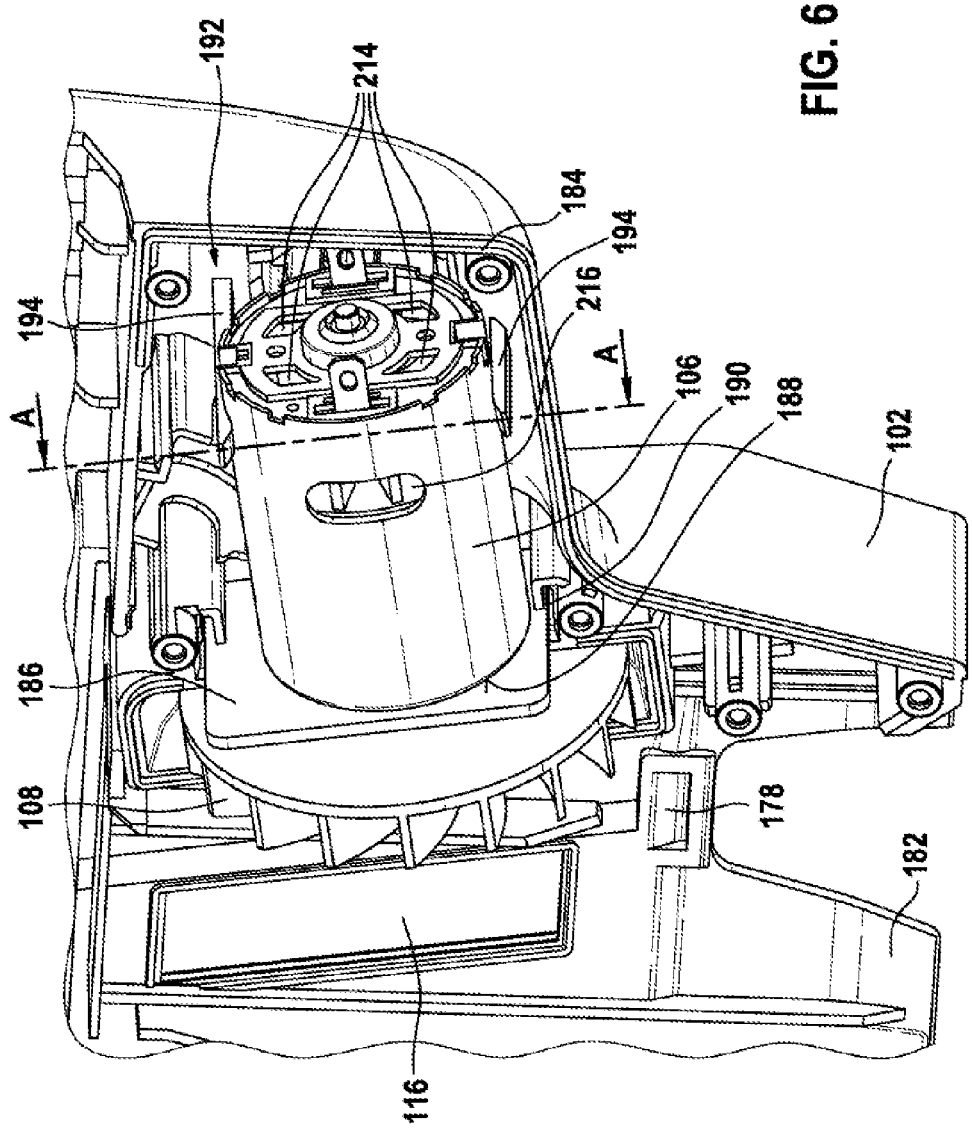
FIG. 6 a perspective partial view of an interior of a housing half-shell of the dust collection box according to FIG. 1, with an inserted electric motor.

FIG. 6 shows the second housing half-shell 182 with an inserted electric motor 106. The electric motor 106 is fastened to a receiving flange 186 by means of a screw connection. The receiving flange 186 is realized as a flat metal plate. The fastening of the electric motor to the receiving flange 186 is effected at a first front end 188 of the electric motor 106. A receiving pocket 190, into which the receiving flange 186 connected to the electric motor can be inserted, is realized in the second housing half-shell 182. Since the electric motor 106 is held in the housing 102 only at one end 188, specifically the first front end 188 of the electric motor 106, during operation of the electric motor 106 the seating of the electric motor 106 is subjected to high loads as a result of occurring vibrations. In order to damp the vibrations caused by the electric motor 106 or by the percussive operation of the hand-held power tool 10, the accessory device 100 has a damping unit 192. The damping unit 192 comprises, by way of example, two damping elements 194, which are arranged on, in particular formed onto, the inner side of the second housing half-shell 182. The damping elements 194 are realized as spring bar elements.

Figure 7:
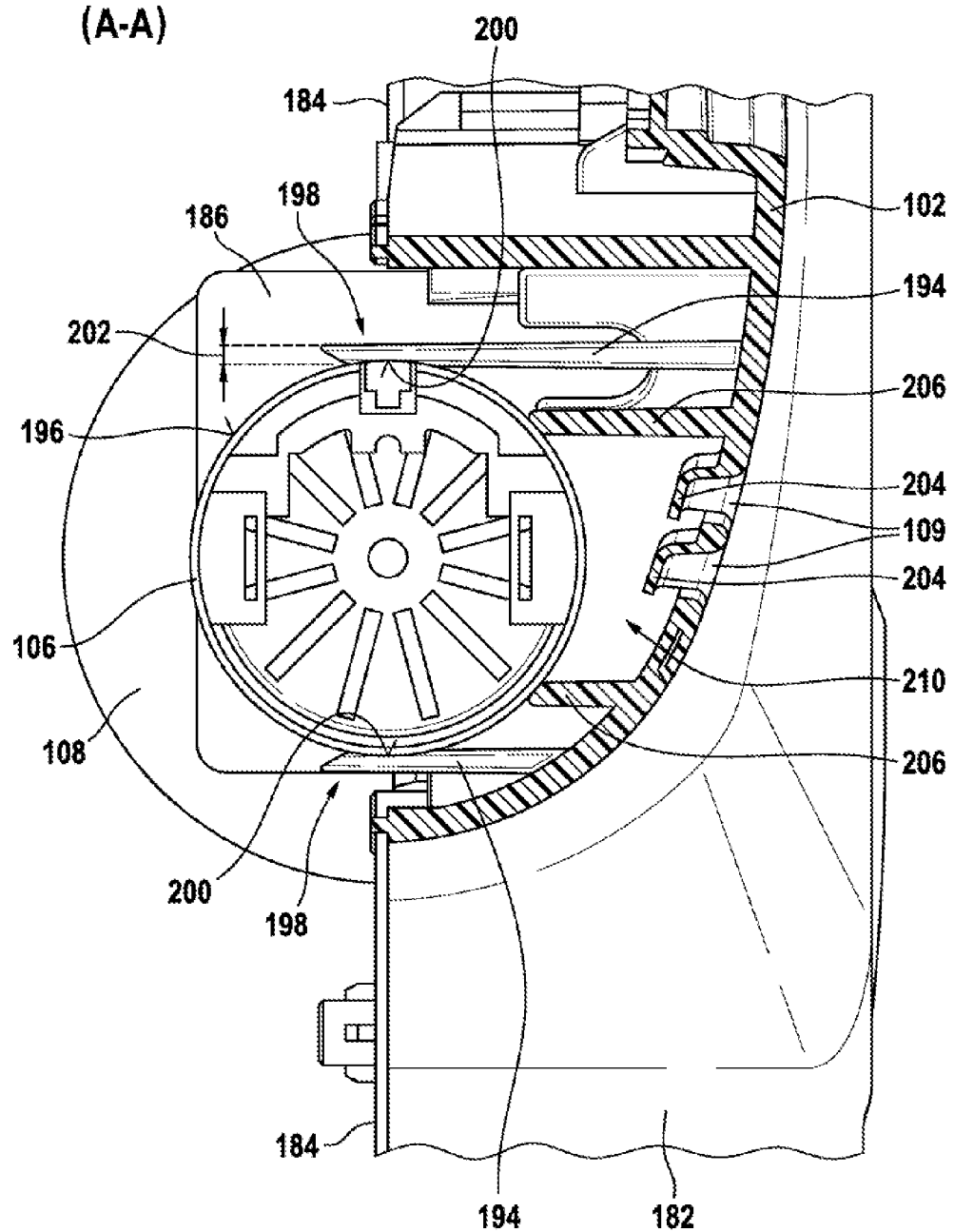
FIG. 7 a section through FIG. 6, along the plane A.

FIG. 7 shows a section through the plane A indicated in FIG. 6. The damping elements 194 extend in a straight direction away from the inner side of the housing half-shell 182 and past the connection plane of the housing half-shells 180, 182. The damping elements 194, which are realized integrally with the second housing half-shell 182, thus extend partly into the space surrounded by the first housing half-shell 180. The damping elements 194 are in bearing contact with the outer circumferential surface 196 of the electric motor 106. The damping elements 194 are advantageously arranged in such a manner that, when in bearing contact with the electric motor 106, they apply a force to the latter radially on both sides. This is realized in that the distance of the two damping elements 194, in particular at their free end 198, is less than the diameter of the electric motor 106. In order to facilitate the insertion of the electric motor 106 between the two damping elements 194, the damping elements 194 are rounded inward at their free end 198. In this way, during insertion, the two damping elements 194 can bend away from each other. The damping elements 194 are arranged above and below the electric motor 106, such that, during operation, the damping unit 192 acts along gravity. The electric motor 106 is supported laterally by the housing 102 of the accessory device 100. The degree of damping by the damping unit 192 can be set via various parameters, such as the number of damping elements 194, the positioning of the damping elements 194, the stiffness of the damping elements 194 and/or the characteristic of a contact surface 200 of the damping elements 194. The stiffness of the damping elements 194 in this case results, in particular, from the distance of the origin of the damping elements 194, on the inner side of the housing 102, from the contact surface 200, and the thickness 202 of the damping elements 194. The characteristic of the contact surface 200 of the damping elements 194 may be realized, for example, by alteration of the roughness of the contact surface, for example by a mechanical or chemical surface treatment, or by coating of the surface. In the region of the contact surface 200 the damping element is in bearing contact with the electric motor 106.

When work is being performed with the hand-held power tool 10, dust particles of differing sizes, from a few μm up to the mm range, may be released from the work surface. In order to prevent large dust particles from getting into the housing 102 of the accessory device 100 via the air passage openings 109, the accessory device 100 has air guide elements 204, which prevent large dust particles from getting into the housing 102. The air guide elements 204 are formed, toward the inside, as housing ribs, onto the housing 102 of the accessory device. The air guide elements 204 are arranged in the region of the air passage openings 109 in such a manner that the entering air, or dust particles, is/are deflected in its/their flight path. In the exemplary embodiment shown, by way of example, all dust particles moving perpendicularly from the outside in the direction of the electric motor 106 are deflected downward by approximately 90°. Larger dust particles in this case collide with the air guide element 204 and lose the greater part of their kinetic energy, enabling possible damage to the electric motor 106 or to a set of electronics 205 of the accessory device 100 to be prevented.

Figure 8:
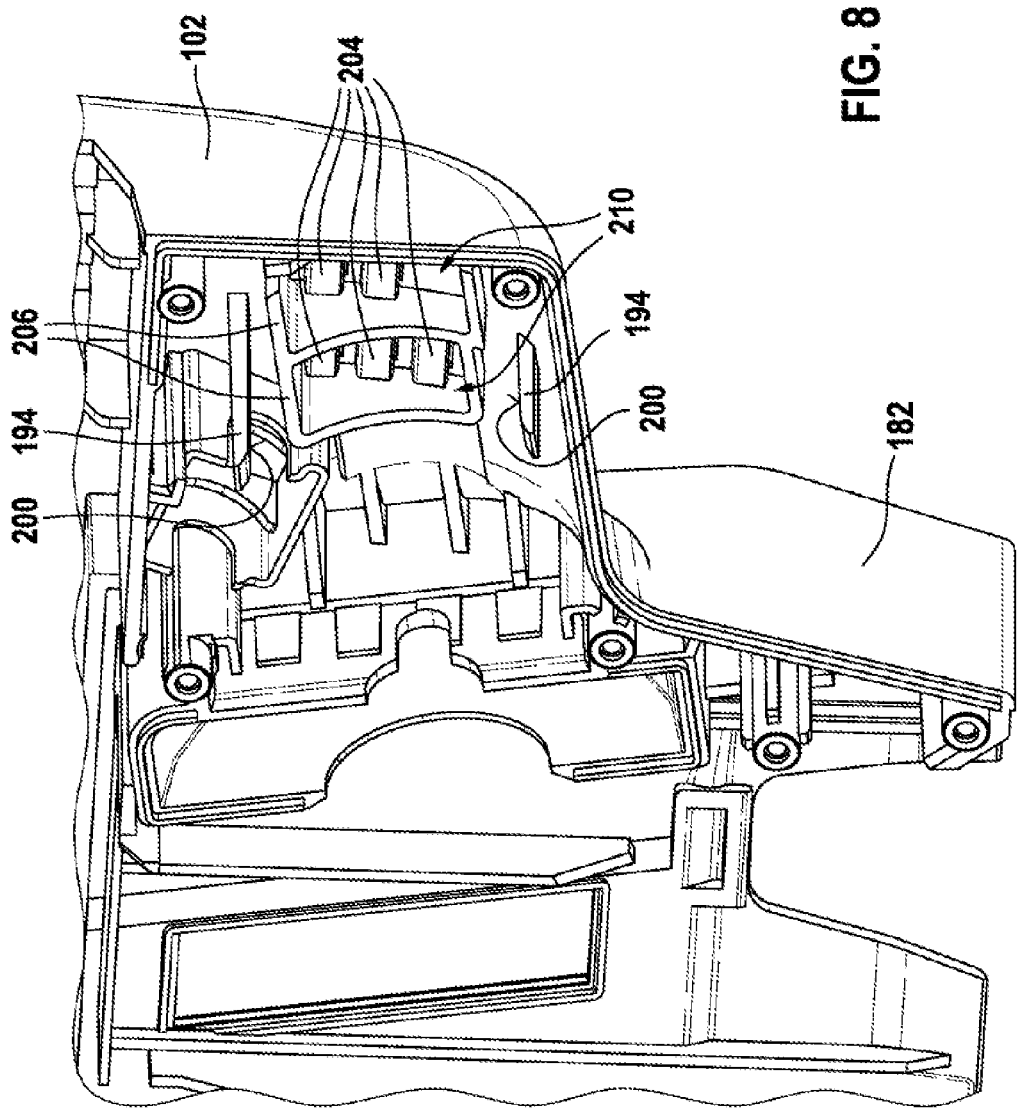
FIG. 8 a perspective partial view of an interior of the housing half-shell of the dust collection box according to FIG. 1.

Shown in FIG. 8 is a perspective partial view of the inner side of the second housing half-shell 182. The air guide elements 204 are domed inwardly in the region of the air passage openings 109 (see FIG. 8). A region on the inner side of the housing half-shell 182, which comprises the air guide elements 204, is formed by a support element 206 that supports the electric motor 106, in particular laterally. Three air guide elements 204 are surrounded by the support element 206 by 360°; two air guide elements 204 are surrounded by the support element 206 by approximately 210°. Since the support elements 206 surround the air guide elements 204 by at least 180°, the support elements 206 form filter receiving pockets 210, into which a filter element, not represented, can be inserted. The filter element may be made from a filter foam such as, for example, ether foam or ester foam. Advantageously, the filter foam is made from a reticulated polyurethane foam. Furthermore, advantageously, the filter foam has a pore size of from 10 ppi to 90 ppi. Advantageously, the air guide elements 204 and the support elements 206 are realized integrally with the housing 102, enabling the accessory device 100 to be produced particularly inexpensively.

The electric motor 106 has at least one air inlet 214 and at least one air outlet 216 (see FIG. 6). The air inlet 214 is arranged opposite the front end 188 of the electric motor 106, while the air outlet 216 is arranged laterally. In order to prevent the electric motor 106 from directly sucking in again its warm exhaust air, the air passage openings 109 are arranged in the region of the air outlets 216. In particular, a straight line that goes out perpendicularly from a rotation axis of the electric motor 106 first intersects the air outlet 216, then the filter element, the air guide element 204 and lastly the air passage opening 109. In particular, the support element 206 surrounds the air passage openings 109 and the air outlet 216 in such a manner that a closed exhaust air channel is formed.

Figure 9:
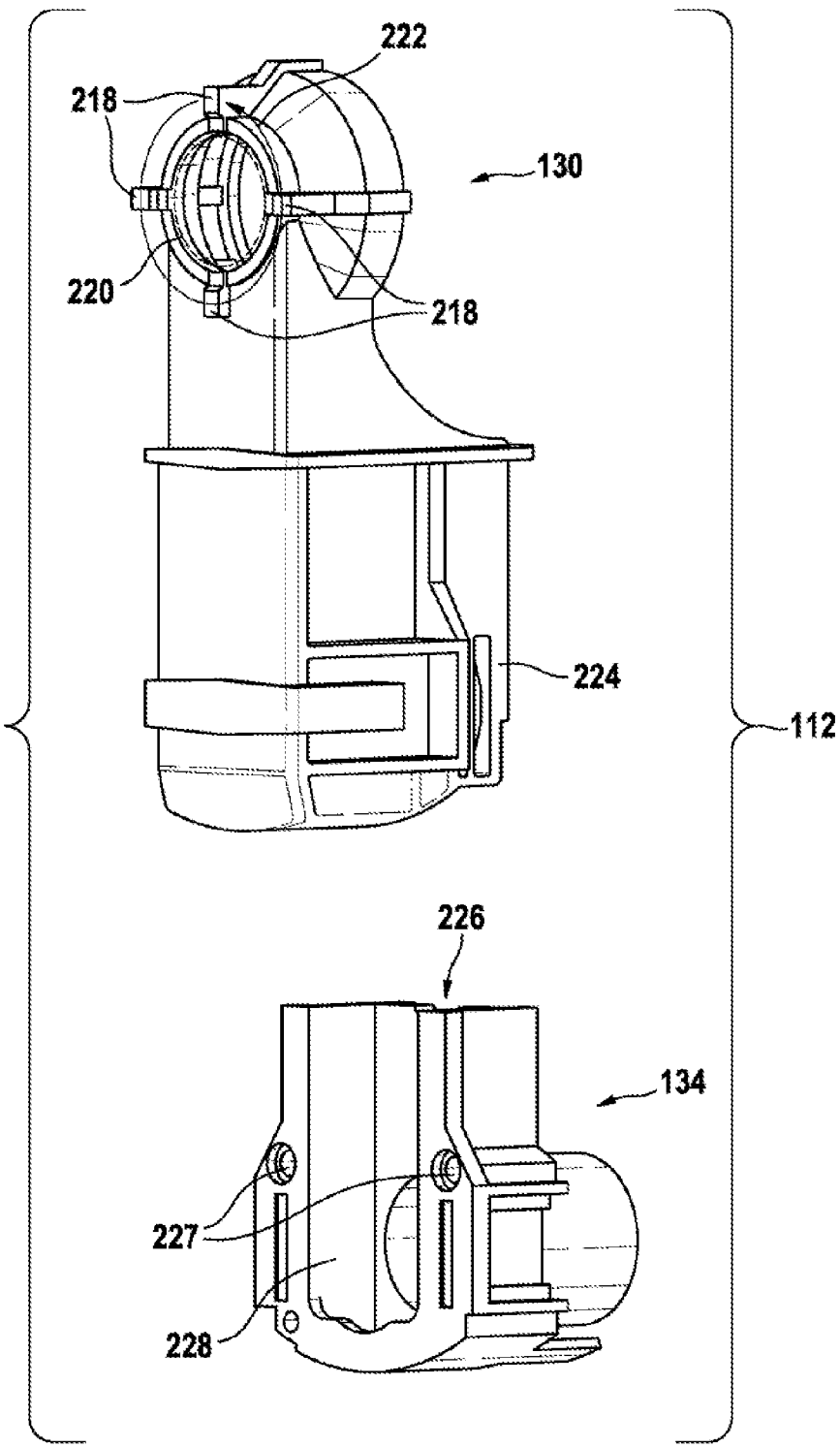
FIG. 9 a perspective view of a suction head for the accessory device according to FIG. 1.

FIG. 9 shows a perspective view of the suction head 112 of the accessory device 100, the dust receiving element 130 being represented separated from the adapter element 134. During operation of the accessory device 100, the dust receiving element 130 is in bearing contact with surface that is being worked. In order to provide an effective air supply for the purpose of removing the dust material, the dust receiving element 130 is applied, via bearing contact surfaces 218, to the surface on which work is to be performed, the bearing contact surfaces 218 being arranged around a work region 220 in which the insert tool 14 performs work on the work surface. The suction head 112 comprises, by way of example, four bearing contact surfaces 218, which extend in the direction of the surface that is being worked. Advantageously, the bearing contact surfaces 218 are arranged on a circular path 222 around the work region 220, the mid-points of the bearing contact surfaces 218 each being spaced apart from each other by approximately 90°. Along the circular path 222 extending around the work region 220, the bearing contact surfaces 218 act upon the surface to be worked, in particular along at most 50% of the circular path 222, advantageously at most 30% of the circular path 222, and particularly preferably at most 15% of the circular path 222. As a result of the contact of the bearing contact surfaces 218 with the surface that is being worked, at least one gap is formed between the surface that is being worked and the dust receiving element 130. Advantageously, a large amount of air can be sucked in through these gaps by the accessory device 100, significantly increasing the effectiveness of removal of dust material at the place of application of the insert tool 14. The bearing contact surfaces 218 are advantageous made from a non-yielding material, in particular a non-yielding plastic.

The dust receiving element 130 is designed to be connectable to the adapter element 134 by being inserted in the latter (cf. FIG. 3). The insertion is effected from above, or perpendicular to the axial movement of the telescopic unit 114. The connection in this case is effected, in particular by non-positive and positive engagement, by corresponding connection elements 224, 226, by way of example by a snap connection. Advantageously, the connection element 224 of the dust receiving element 130 is realized as a positive engagement element, which engages in the connection element 226 of the adapter element 134 that is realized as a corresponding recess in a wall of the adapter element 134. To enable rapid separation of the connection, the connection element 224 of the dust receiving element 130 projects beyond the wall of the adapter element 134 (can be seen in FIG. 2). The adapter element 134 is fastened to the accessory device 100 by means of screws, which are guided in screw bosses 227. In the non-connected state, advantageously, the air channel 105 of the accessory device 100 can easily be assessed, and cleaned, in a straight line via the partly open end 228 of the adapter element 134 on the worked surface side.

Figure 10:
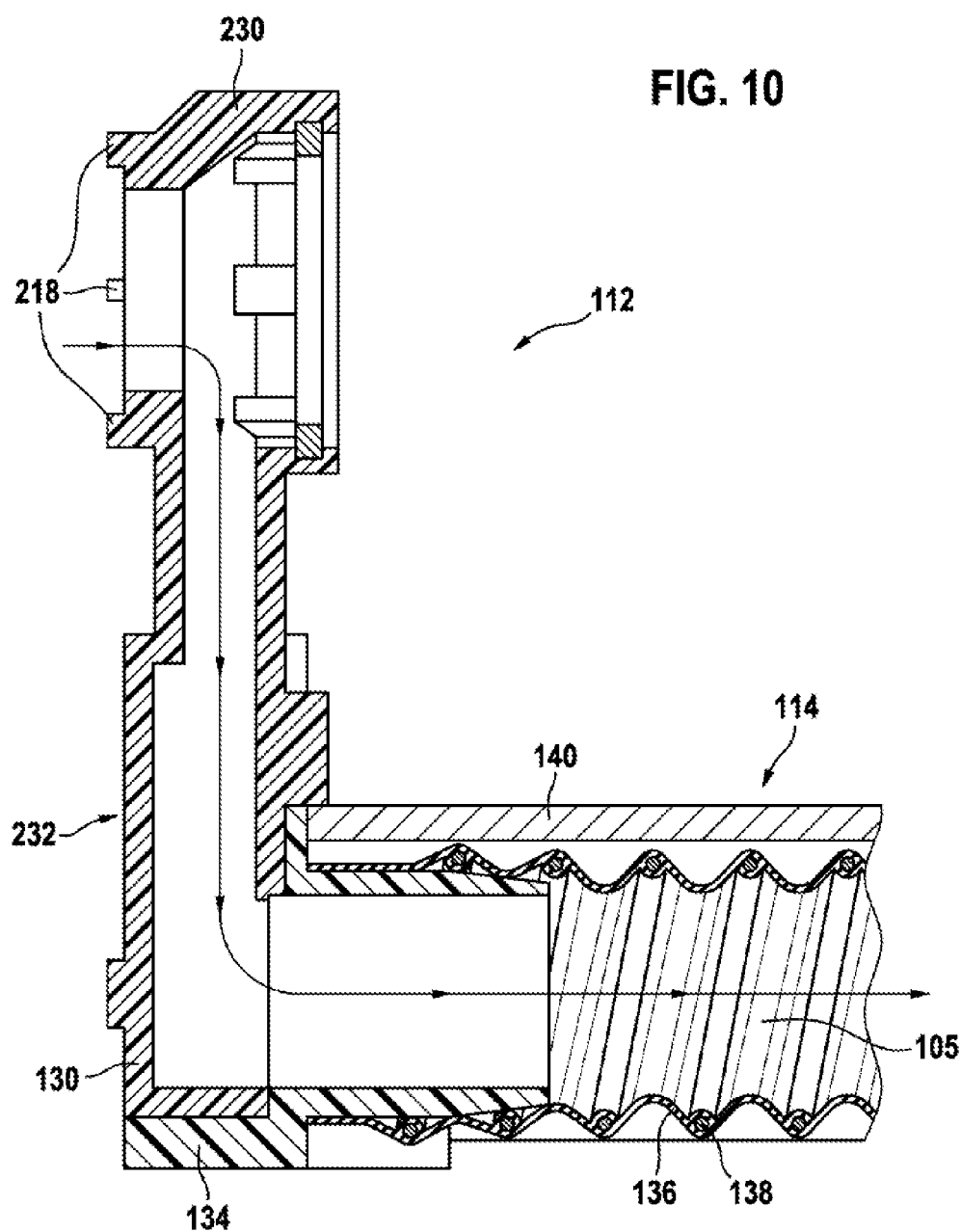
FIG. 10 a longitudinal section of an alternative embodiment of the suction head.

Shown in FIG. 10, in a longitudinal section, is an alternative embodiment of the suction head 112. The adapter element 134 in this case has the same structure as in the previous exemplary embodiment, and is separably connected to a further dust receiving element 230. The dust receiving element 230 differs from the dust receiving element 130 in its length. As can be seen in FIG. 10, at the front end 232 of the suction head 112 the further dust receiving element 230 terminates substantially flush with the adapter element 134. Only the bearing contact surfaces 218 of the further dust receiving element 230 project forward. Thus, the length of the accessory device 100 is not substantially altered by the further dust receiving element 230. In contrast, as can be seen in FIG. 3, the length of the accessory device 100 is increased significantly by the dust receiving element 130. Thus, by changing the dust receiving elements 130, 230, the axial distance between the front end 232 of the suction head and the tool receiver 16 of the hand-held power tool 10 can be altered. This may be used, for example, to always enable the entire axial movement clearance of the telescopic unit 114 to be utilized. If, for example, the hand-held power tool 10 having the tool receiver 16 realized as an exchangeable drill chuck is replaced by a hand-held power tool having a fixed drill chuck, the consequently reduced length of the hand-held power tool can be compensated by the further dust receiving element 230. Owing to the short length, the air inside the further dust receiving element 230 is guided substantially in a straight line. Advantageously, in the dust receiving element 130, which is of a longer design, the air can be guided on a substantially circular arc-type or elliptical path, as a result of which the suction head can be optimized in respect of flow.

Figure 11:
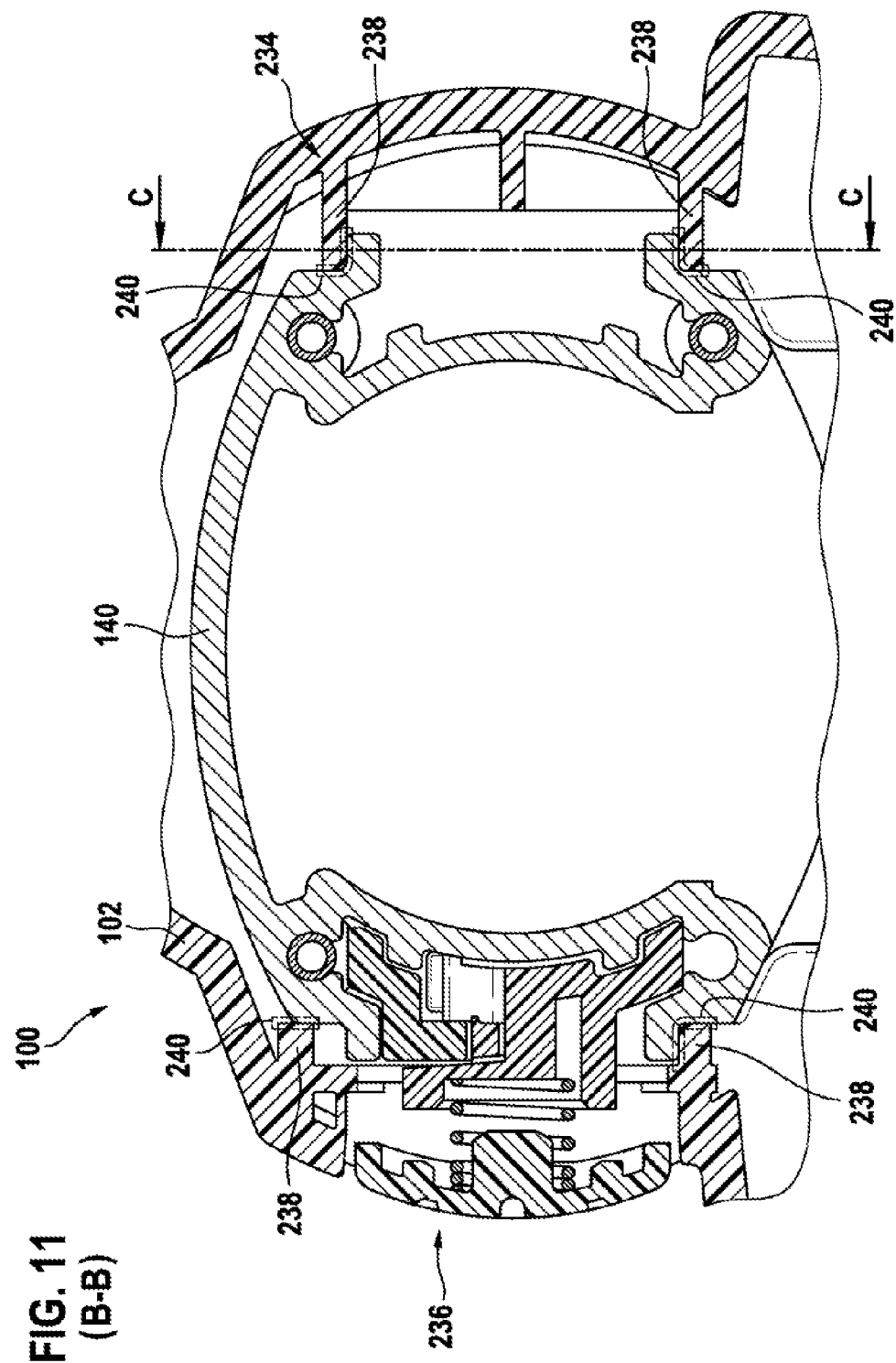
FIG. 11 a partial view of a section through the plane B indicated in FIG. 1.

Shown in FIG. 11, in a partial view, is a section through the plane B indicated in FIG. 1. The section shows a housing guide 234 for the telescopic unit 114, in which, in particular, the telescopic element 140 of the telescopic unit 114 is seated in an axially movable manner in the housing 102. Furthermore, also shown is a part of an actuation mechanism 236 of the telescopic unit 114, which is designed to prevent a movement of the telescopic unit 114 in the non-actuated state. The housing guide 234 comprises guide elements 238, which are realized, by way of example, as guide rails. The guide elements 238 are arranged in the housing 102 of the accessory device 100 in such a manner that, in the mounted state, the telescopic unit 114, in particular the telescopic element 140, is guided on at least one lateral surface of the guide elements 238. The guide elements 238 are formed onto the inner side of the housing 102. As an alternative to this one-part design of the guide elements 238 with the housing 102, it is also conceivable that the guide elements 238 can be realized by separate housing elements. The contact surfaces of the telescopic unit 114 with the guide elements 238 constitute wear surfaces 240, since at this location, upon each movement of the telescopic unit 114, a friction is produced between the telescopic unit 114 and the housing guide 234. A small amount of play is provided between the contact surfaces in order to ensure that the telescopic unit 114 is displaceable in the housing guide 234.

Figure 12:
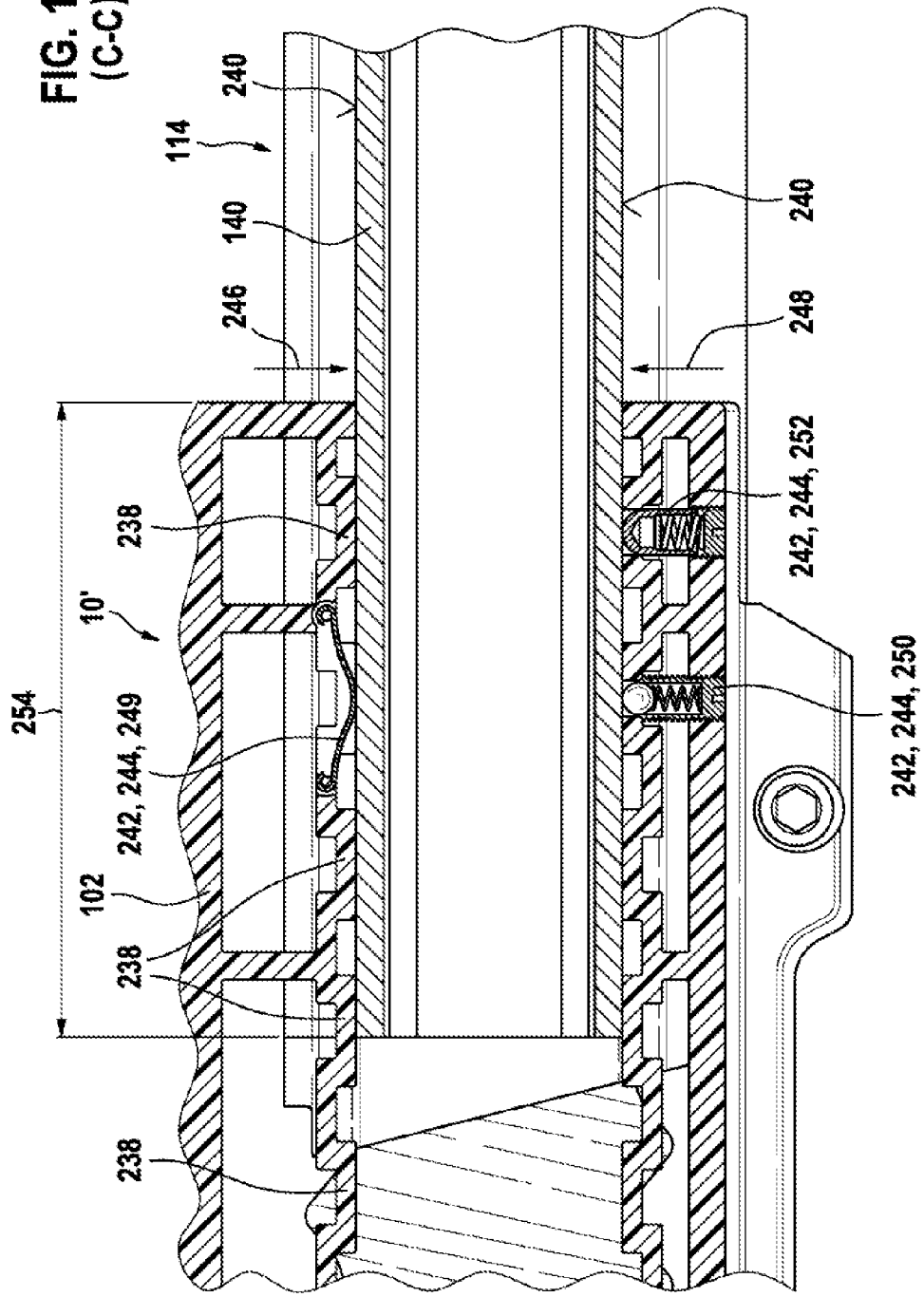
FIG. 12 a first alternative embodiment of the accessory device.

Shown in FIG. 12 is an alternative embodiment of the accessory device 100, which substantially has all features of the previously described accessory device 100, and which by way of example has securing elements 242, which counteract the wear on the wear surfaces 240. The longitudinal section in FIG. 12 in this case extends along the plane C indicated in FIG. 11. The accessory device 100 has, by way of example, three differing securing elements 242, which are arranged between the telescopic unit 114 and the housing 102. The securing elements 242, by way of example, are fastened to the housing of the accessory device 100, but it is also conceivable for the securing elements 242 to be fastened to the telescopic unit 114. The securing elements 242 are realized as mechanical energy storage elements 244. The telescopic unit 114, in particular the telescopic element 140, is biased by the securing elements 242 in a first direction 246 and in a direction 248 that is opposite to the first direction. The first direction 246 in this case corresponds to the direction of gravity. The first securing element 242 is realized as a spring plate 249. The spring plate 249 is centrally in bearing contact with the telescopic element 140, and biases the latter in the direction of its spring force. The second securing element 242 is realized as a ball pressure piece 250. The ball pressure piece 250 is composed of a spring-loaded ball, which is seated in the housing 102 of the accessory device 100. The third securing element 242 is realized as a contact retention clip 252.

In FIG. 12 the telescopic unit 114 is shown in an extended state. In the extended state the housing 102 surrounds the telescopic unit 114 in an inlet region 254. The wear surfaces 240 within this inlet region 254, unlike the wear surfaces 240 outside of this inlet region 254, are subjected to load upon each movement of the telescopic unit 114. The securing elements 242 are therefore advantageously arranged in the inlet region 254.

Figure 13:
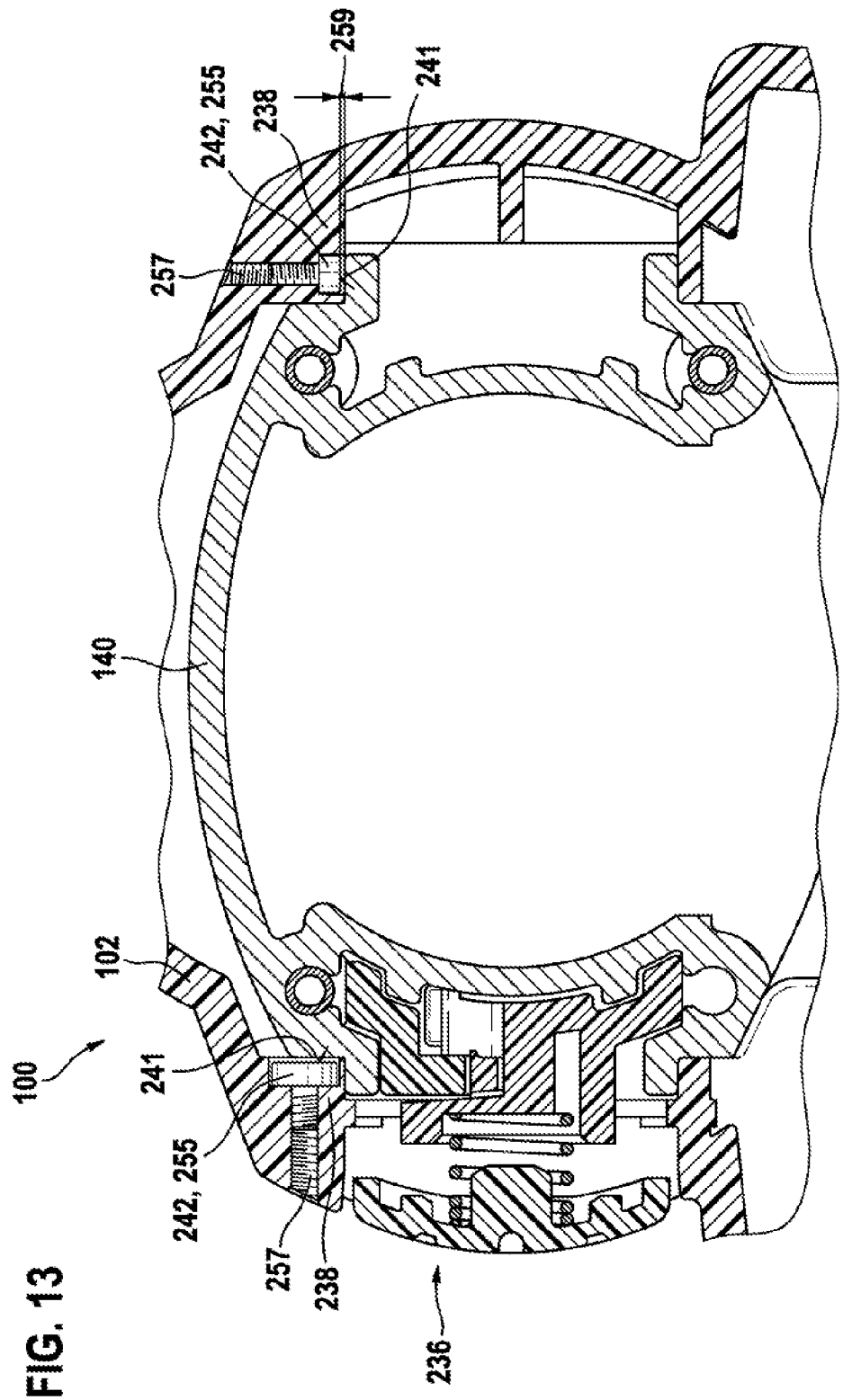
FIG. 13 a second alternative embodiment of the accessory device having an alternative securing element.

Shown in FIG. 13, in a second alternative embodiment of the accessory device 100, is a securing element 242, which does not generate bias, but which is constructed in such a manner that a contact surface 241 of the securing element 242 becomes a wear surface only after a wear threshold has been attained. In FIG. 13 the securing element 242 is realized, by way of example, as a metallic element, in particular a screw 255, which is received by the housing 102 of the accessory device 100. The screw 255 is arranged in the housing 102 in such a manner that, when the accessory device is in a state without wear, there is no contact between the screw 255 and the telescopic element 140. It is likewise conceivable for the screw 255 to be first countersunk in the screw hole 257. The distance 259 between a screw head of the screw 255 and the upper end of a screw hole 257 defines a wear threshold. After the upper end of the screw hole 257 has been worn by friction, the wear threshold would have been attained, and the securing element 242, in the form of the screw 255, comes into contact with the telescopic element 140.

The telescopic element 140 is formed from a metallic material, in particular aluminum, the guide elements 243 being composed of plastic. The telescopic element 140 and the guide elements 238 thus advantageously form a plastic/metal pairing, which further reduce the wear.

Figure 14:
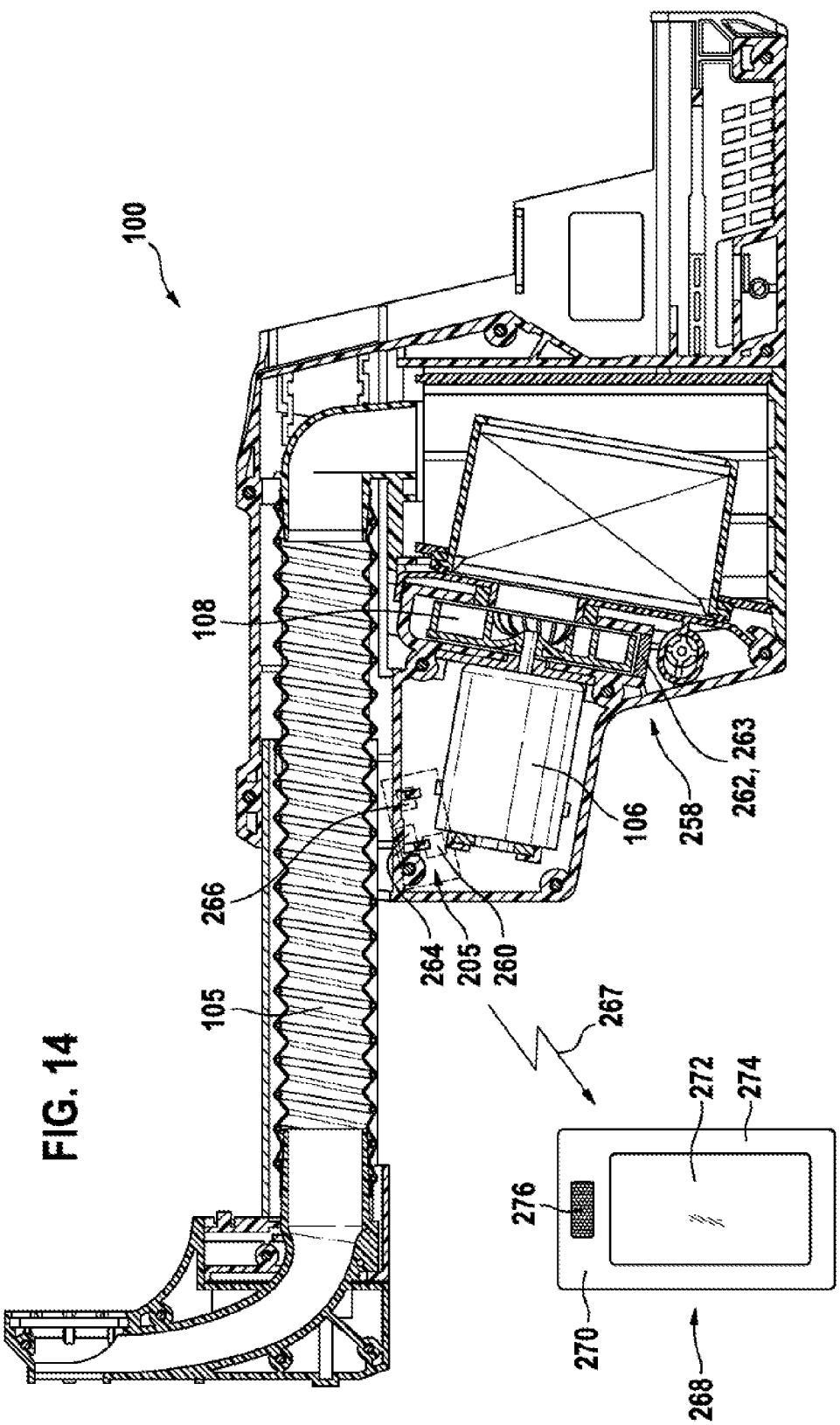
FIG. 14 a longitudinal section of a third alternative embodiment of the accessory device having a sensor unit.

Shown in FIG. 14 is a longitudinal section of a third alternative embodiment of the accessory device 100, having a sensor unit 258, which is designed to detect a variation of the pressure and/or in the volume flow. The sensor unit 258 comprises a motor sensor element 260, which is designed to detect the rotational speed of the electric motor 106, and an, in particular, electronic air sensor element 262, which is designed to detect a change in the pressure and/or in the volume flow within the accessory device 100. Although combination of the motor sensor element 260 with the electronic air sensor element 262 is not absolutely necessary for the functional capability of the sensor unit 258, it may be used to increase the precision of detection. The sensor unit 258 additionally has a control unit 264, which is designed to evaluate the signal of the motor sensor element 260 and of the air sensor element 262. The motor sensor element 260 is realized, by way of example, as part of the set of electronics 205 of the accessory device 100. The set of electronics 205 of the accessory device 100 is designed, in particular, to control the electric motor 106. A change in the pressure and/or of the volume flow results in a variation of the rotational speed of the electric motor 106, which can be measured by the set of electronics 205 by means of the current applied to the electric motor 106. The air sensor element 262 is realized, by way of example, as a standard commercial pressure sensor 263, which is electrically connected to the control unit 264. The air sensor element 262 is advantageously arranged in the region of the fan element 108. The control unit 264 senses the input signals of the motor sensor element 260 and of the air sensor element 262 and, on the basis of a comparison of the values of the input signals, or the change in the input signals over time, ascertains the state of the accessory device 100. A fault signal is output in dependence on an ascertained blocked state of the accessory device 100, or of the air channel 105 of the accessory device 100. The output of the fault signal is effected, in particular, via a communication interface 266, which is designed to wirelessly transmit 267 information to an indicating unit 268. The indicating unit 268 is realized, by way of example, as a smartphone 270 that receives the fault signal of the sensor unit 258 and, in dependence on the fault signal, controls an optical indicating element 272, a haptic indicating element 274 and/or an acoustic indicating element. The fault signal may be output optically via the optical indicating element 272 realized as a screen, haptically via the haptic indicating element 274 realized as a vibration mechanism, and acoustically by the acoustic indicating element 276 realized as a loudspeaker.

It is likewise conceivable that, in an alternative embodiment, the indicating unit 268 is arranged, at least partly, on the housing 102 of the accessory device 100 or on the housing 12 of the hand-held power tool 10. In this exemplary embodiment, the communication interface 266 may be designed to transmit the fault signal, via an electrical contact and/or via a wireless connection, to the indicating unit 268.

Figure 15:
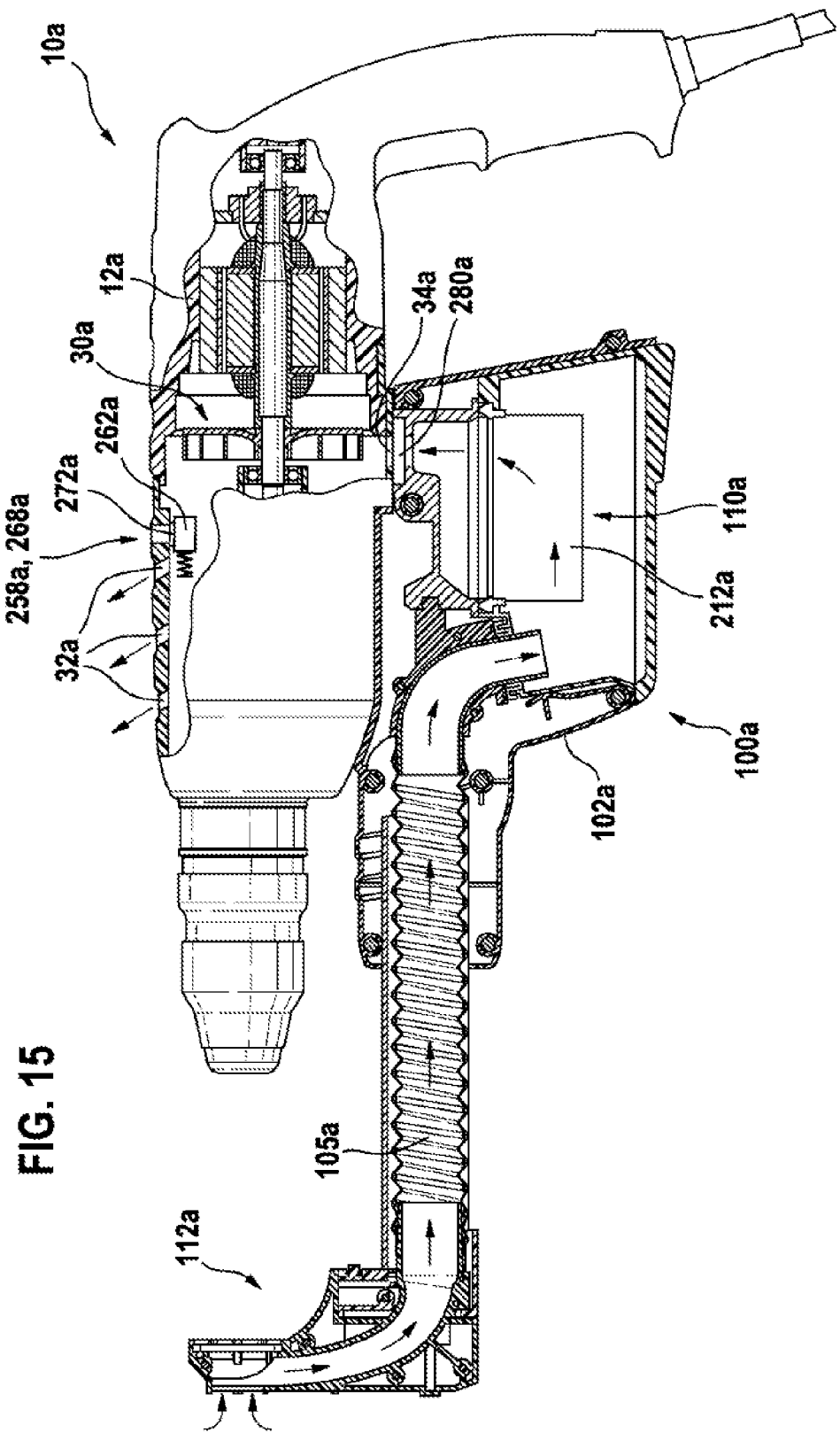
FIG. 15 a longitudinal section of a fourth alternative embodiment of the accessory device.

Shown in FIG. 15 is a fourth embodiment of the accessory device 100a, having alternative embodiment of the sensor unit 258a, in which the indicating element 272a of the indicating unit 268a is realized as a fill-level indicator. This embodiment also differs from the preceding embodiment in that the accessory device 100a does not have a fan unit. The airflow required for the accessory device 100a is generated, instead of by the fan unit, by means of the motor cooling system 30a of the hand-held power tool 10a, and the air channel 105a of the accessory device 100a runs from the suction head 112a of the accessory device 100a, via a filter element 212a, to air outlet openings 32a, which are arranged on the upper side of the housing 12a of the hand-held power tool 10a. The motor cooling system 30a of the hand-held power tool 10a preferably comprises a fan element that is realized as a double fan. Advantageously, the fan element of the hand-held power tool 10a comprises two differing air-guide, or vane, geometries, the one air-guide geometry being provided to supply the electric motor of the hand-held power tool 10a with cooling air, and the other air-guide geometry being provided to supply the accessory device 100a with cooling air. The air outlet openings 32a are advantageously shaped in such a manner that the outflowing air is guided asymmetrically, advantageously away from the user, out of the hand-held power tool 10a. The housing 102a of the accessory device 100a and the housing 12a of the hand-held power tool 10a have mutually corresponding transition openings 34a, 280a, via which the airflow from the accessory device 100a can pass into the hand-held power tool 10a. The transition openings 34a, 280a are arranged beneath the motor cooling system 30a of the hand-held power tool 10a and above the filter element 212a. It is conceivable for the sensor unit 258a to be arranged at different positions, in particular behind the filter element 212a in the direction of flow. The sensor unit 258a is advantageously arranged on the upper side of the housing 12a of the hand-held power tool 10a, in particular in the region of the air outlet openings 32a.

Figure 16A:
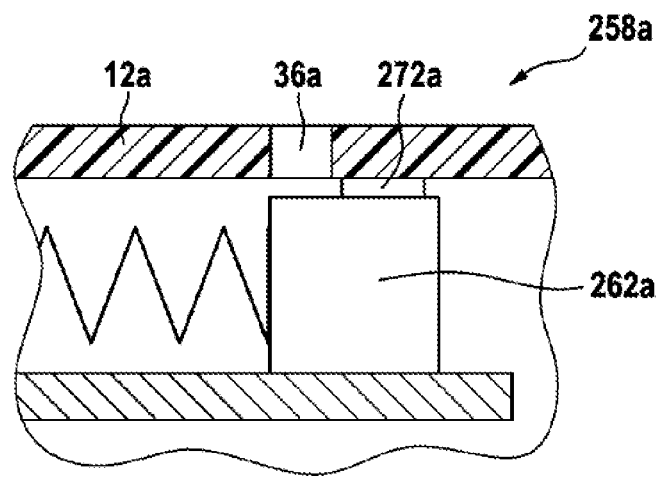
FIG. 16 *a-c* a longitudinal section of a sensor unit for an sensor unit according to FIG. 15, in various states.
Figure 16B:
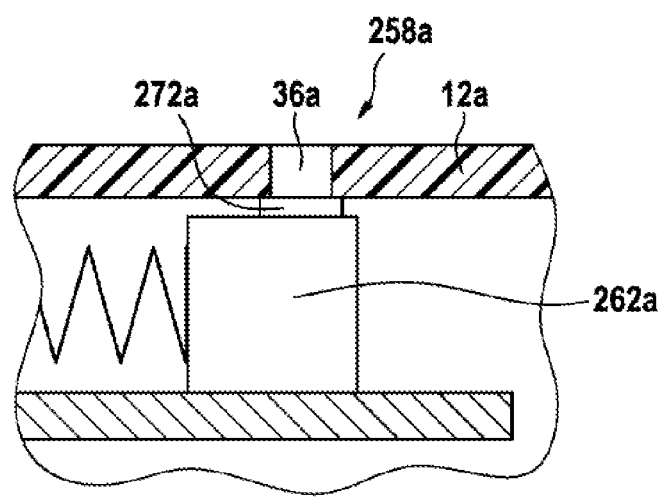
Figure 16C:
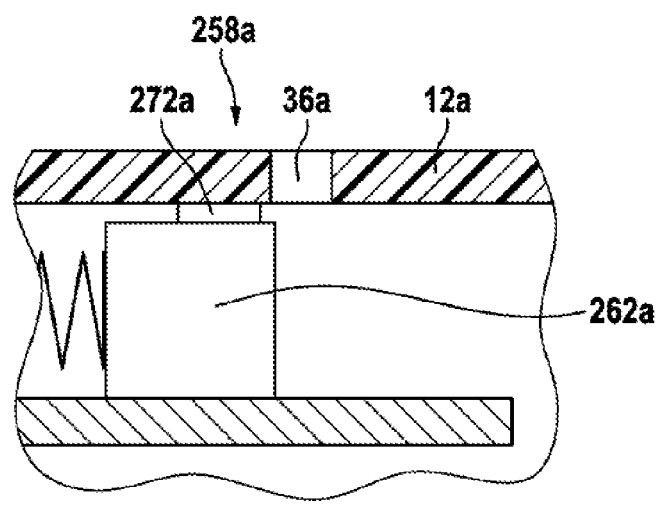

As is shown in greater detail in FIG. 16 a-c, the sensor unit 258a has a mechanical air sensor element 262a, which is seated so as to be movable contrary to a spring force. A variation of the pressure or in the volume flow in the region of the mechanical air sensor element 262a in this case result in a change in the position of the mechanical air sensor element 262a. The movement of an optical indicating element 272a is coupled to the movement of the mechanical air sensor element 262a. Advantageously, the housing 12a of the hand-held power tool 10a has a window or an opening 36a, through which the position of the indicating element 272a can be tracked, the fill level of the dust collection box 110a of the accessory device 100a being able to be ascertained by the position of the indicating element 272a. In FIG. 16a, the position of the indicating element 272a indicates an empty dust collection box 110a; in FIG. 16b, the position of the indicating element 272a indicates a full dust collection box 110a; in FIG. 16a, the hand-held power tool 10a has been switched off.

The invention claimed is:

1. An accessory device for a hand-held power tool, comprising:
   a dust collection box having a housing and a filter unit configured to filter an airflow, the housing configured to be connected to the accessory device via a first fastening unit, the filter unit configured to be connected to the housing of the dust collection box via a second fastening unit defined between said filter unit and said housing of the dust collection box,
   wherein the filter unit has a first sealing element arranged on a dust collection box side and a second sealing element arranged on an accessory device side such that the filter unit is configured to be sealed off from the housing of the dust collection box and a housing of the accessory device via the first and second sealing elements, and
   wherein the second fastening unit has at least one second actuation element on the filter unit, and wherein the connection between the housing of the dust collection box and the filter unit is configured to be separated by an actuation of the second actuation element.

2. The accessory device as claimed in claim 1, wherein the first fastening unit has at least one first actuation element, and wherein the connection between the dust collection box and the accessory device is configured to be separated by an actuation of the first actuation element.

3. The accessory device as claimed in claim 1, wherein the filter unit has a filter element that is fastened to a frame element.

4. The accessory device as claimed in claim 1, wherein the at least one second actuation element of the second fastening unit is formed onto a frame element.

5. The accessory device as claimed in claim 1, wherein the dust collection box is configured to be received by the housing of the accessory device in a direction radial to a working axis of the hand-held power tool.

6. The accessory device as claimed claim 1, wherein the dust collection box is at least partly surrounded by the housing of the accessory device in the circumferential direction.

7. The accessory device as claimed in claim 1, wherein the housing of the accessory device has at least one recess that makes visible a fill level of the dust collection box.

8. The accessory device as claimed in claim 1, wherein the dust collection box, when fastened to the accessory device, is at least partly in bearing contact with a housing element that is seated with play.

9. A dust collection box for an accessory device s, comprising:
    a housing configured to be connected to the accessory device via a first fastening unit; and
    a filter unit configured to filter an airflow, the filter unit further configured to be connected to the housing of the dust collection box via a second fastening unit defined between said filter unit and said housing of the dust collection box,
    wherein the filter unit has a first sealing element arranged on a dust collection box side and a second sealing element arranged on an accessory device side such that the filter unit is configured to be sealed off from the housing of the dust collection box and a housing of the accessory device via the first and second sealing elements, and
    wherein the second fastening unit has at least one second actuation element on the filter unit, and wherein the connection between the housing of the dust collection box and the filter unit is configured to be separated by an actuation of the second actuation element.

10. The accessory device as claimed in claim 1, wherein the dust collection box, when fastened to the accessory device, is at least partly in bearing contact with a housing element that is seated with play.

11. The accessory device as claimed in claim 8, wherein the filter unit is at least partly in bearing contact with the housing element that is seated with play.

12. The accessory device as claimed in claim 1, wherein the hand-held power tool is configured with a percussion mechanism.

13. The accessory device as claimed in claim 9, wherein the first fastening unit has at least one first actuation element, and wherein the connection between the housing and the accessory device is configured to be separated by an actuation of the first actuation element.

14. The accessory device as claimed in claim 9, wherein the filter unit has a filter element that is fastened to a frame element.

15. The accessory device as claimed in claim 9, wherein the second actuation element of the second fastening unit is formed onto a frame element.

\* \* \* \* \*

UNITED STATES PATENT AND TRADEMARK OFFICE
CERTIFICATE OF CORRECTION

Page 1 of 1

PATENT NO. : 11,123,830 B2
APPLICATION NO. : 16/479560
DATED : September 21, 2021
INVENTOR(S) : Ullrich et al.

It is certified that error appears in the above-identified patent and that said Letters Patent is hereby corrected as shown below:

In the Claims

In Claim 9, at Column 21, Lines 19-20: "accessory device s, comprising:" should read --accessory device, comprising:--.

Signed and Sealed this
Eighth Day of March, 2022

Drew Hirshfeld
*Performing the Functions and Duties of the*
*Under Secretary of Commerce for Intellectual Property and*
*Director of the United States Patent and Trademark Office*